US007471302B2

(12) United States Patent
Fukuda et al.

(10) Patent No.: US 7,471,302 B2
(45) Date of Patent: Dec. 30, 2008

(54) DISPLAY DRIVER AND ELECTRONIC INSTRUMENT

(75) Inventors: Masafumi Fukuda, Matsumoto (JP); Tadashi Yasue, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 650 days.

(21) Appl. No.: 11/075,692

(22) Filed: Mar. 10, 2005

(65) Prior Publication Data

US 2005/0212826 A1 Sep. 29, 2005

(30) Foreign Application Priority Data

Mar. 23, 2004 (JP) ............................ 2004-085386

(51) Int. Cl.
*G09G 5/10* (2006.01)

(52) U.S. Cl. ...................................................... 345/690

(58) Field of Classification Search ................. 345/690, 345/22, 63, 77, 89, 581–618; 340/815.55
See application file for complete search history.

(56) References Cited

U.S. PATENT DOCUMENTS

| | | | | |
|---|---|---|---|---|
| 5,663,745 | A | 9/1997 | Ishikawa et al. | |
| 5,703,616 | A * | 12/1997 | Kawasugi | 345/98 |
| 5,852,428 | A | 12/1998 | Ishikawa et al. | |
| 7,266,747 | B2 * | 9/2007 | Foss | 714/755 |

FOREIGN PATENT DOCUMENTS

| | | |
|---|---|---|
| JP | A-03-111932 | 5/1991 |
| JP | A-05-037969 | 2/1993 |
| JP | A-06-095618 | 4/1994 |
| JP | A-06-195043 | 7/1994 |
| JP | A-06-324644 | 11/1994 |
| JP | A 07-281636 | 10/1995 |
| JP | A-09-171171 | 6/1997 |
| JP | A-09-237076 | 9/1997 |
| JP | A-10-340067 | 12/1998 |
| JP | A-11-282432 | 10/1999 |

OTHER PUBLICATIONS

U.S. Appl. No. 11/075,857, filed Mar. 10, 2005, Fukuda et al.
U.S. Appl. No. 11/085,157, filed Mar. 22, 2005, Fukuda et al.

* cited by examiner

*Primary Examiner*—Alexander Eisen
*Assistant Examiner*—Christopher E Leiby
(74) *Attorney, Agent, or Firm*—Oliff & Berridge PLC

(57) ABSTRACT

A display driver includes: a parity generation circuit which generates s-bit parity data for n-bit display data input through a processor interface, combines the n-bit display data and the s-bit parity data, and outputs the combined n-bit display data and s-bit parity data to a display memory as (n+s)-bit display data; a parity check circuit which performs data error detection for the (n+s)-bit display data sequentially input from the display memory in units of (n+s) bits, and outputs the n-bit display data; at least one decoder which decodes the n-bit display data output from the parity check circuit; a plurality of latch circuits which latch the data decoded by the decoder; and a plurality of data line driver sections which drive data lines of a display panel based on the data latched by the latch circuits.

15 Claims, 21 Drawing Sheets

PROCESSOR INTERFACE 50
PARITY GENERATION 60
CONTROL 300
PARITY CHECK 70
DECODER 100
FRC DECODER 110
MLS DECODER 120
DISPLAY MEMORY 200
WL1 WL2 WLQ DA1 PR1 X Y
DISPLAY DATA n BITS
PARITY s BITS
(n+s) BITS
LB1 LB2 LAx LP1 LA1 LA2
ADDRESS DECODER 400
LATCH LATCH LATCH
DRV DRV DRV
DATA LINE DRIVER DATA LINE DRIVER DATA LINE DRIVER
10

| GRAYSCALE DATA | | FRAME NUMBER 1 | 2 | 3 | 4 |
|---|---|---|---|---|---|
| 0 | 0 | 0 | 0 | 0 | 0 |
| 0 | 1 | 1 | 0 | 0 | 1 |
| 1 | 0 | 1 | 0 | 1 | 1 |
| 1 | 1 | 1 | 1 | 1 | 1 |

FIG. 13

| PTY-MODE | | D2 | D1 | D0 | PTY-BIT |
|---|---|---|---|---|---|
| EVEN PARITY | 0 | 0 | 0 | 0 | 0 |
| | 0 | 0 | 0 | 1 | 1 |
| | 0 | 0 | 1 | 0 | 1 |
| | 0 | 0 | 1 | 1 | 0 |
| | 0 | 1 | 0 | 0 | 1 |
| | 0 | 1 | 0 | 1 | 0 |
| | 0 | 1 | 1 | 0 | 0 |
| | 0 | 1 | 1 | 1 | 1 |
| ODD PARITY | 1 | 0 | 0 | 0 | 1 |
| | 1 | 0 | 0 | 1 | 0 |
| | 1 | 0 | 1 | 0 | 0 |
| | 1 | 0 | 1 | 1 | 1 |
| | 1 | 1 | 0 | 0 | 0 |
| | 1 | 1 | 0 | 1 | 1 |
| | 1 | 1 | 1 | 0 | 1 |
| | 1 | 1 | 1 | 1 | 0 |

PTY-MODE
D0
D1
D2
PARITY GENERATION
60
EXOR1
EXOR2
EXOR3
PTY-BIT
200
DISPLAY MEMORY

PTY-MODE
PTY-BIT
D0
D1
D2
EXOR1
EXOR2
EXOR3
EXOR4
ERS
TO CONTROL CIRCUIT
100
DECODER
70
PARITY CHECK

DISPLAY DRIVER AND ELECTRONIC INSTRUMENT

Japanese Patent Application No. 2004-85386, filed on Mar. 23, 2004, is hereby incorporated by reference in its entirety.

BACKGROUND OF THE INVENTION

The present invention relates to a display driver and an electronic instrument.

In recent years, a display panel has been increasingly demanded accompanying an increase in functionality of electronic instruments. As a drive method for a display panel, various methods have been proposed. A driver circuit disclosed in Japanese Patent Application Laid-open No. 7-281636 has been known as an example. Japanese Patent Application Laid-open No. 7-281636discloses a circuit which drives a display panel by using 10 column drivers when the display panel includes 640×480 pixels, for example. A calculation circuit is provided in each column driver. Since the calculation circuit simultaneously processes display data for 7 lines×480 columns read from a memory, the calculation circuit becomes complicated and the circuit area is increased.

Moreover, since the amount of display data is increased as the resolution of the display panel is increased, the driver circuit of the display panel also becomes complicated. If the circuit becomes complicated, manufacturing cost is increased due to an increase in the chip area and the design period. In particular, the area of the calculation circuit is considerably increased in the driver circuit disclosed in Japanese Patent Application Laid-open No. 7-281636.

According to the configuration of the display memory disclosed in Japanese Patent Application Laid-open No. 7-281636, voltage may be applied to a word gate of a transistor which makes up the display memory when an unexpected voltage is applied to a wordline of the display memory, whereby erroneous data may be written into the display memory. In this case, one vertical line is displayed on the display panel, and the erroneous display state continues until the display memory is rewritten.

SUMMARY

A first aspect of the present invention relates to a display driver including:

a parity generation circuit which generates s-bit (s is an integer of one or more) parity data for n-bit (n is an integer greater than one) display data input through a processor interface, combines the n-bit display data and the s-bit parity data, and outputs the combined n-bit display data and s-bit parity data to a display memory as (n+s)-bit display data;

a parity check circuit which performs data error detection for the (n+s)-bit display data sequentially input from the display memory in units of (n+s) bits, and outputs the n-bit display data;

at least one decoder which decodes the n-bit display data output from the parity check circuit;

a plurality of latch circuits which latch the data decoded by the decoder; and a plurality of data line driver sections which drive data lines of a display panel based on the data latched by the latch circuits.

A second aspect of the present invention relates to a display driver including:

a parity check circuit which performs data error detection for (n+s)-bit display data (n is an integer greater than one, and s is an integer of one or more) sequentially input in units of (n+s) bits from a display memory and outputs n-bit display data, the display memory storing the (n+s)-bit display data in which s-bit parity data generated based on the n-bit display data and the n-bit display data are combined;

at least one decoder which decodes the n-bit display data output from the parity check circuit;

a plurality of latch circuits which latch the data decoded by the decoder; and a plurality of data line driver sections which drive data lines of a display panel based on the data latched by the latch circuits, wherein the (n+s)-bit display data is read from the display memory and output to the parity check circuit by performing a wordline control for the display memory once, wherein the decoder decodes the n-bit display data sequentially output from the parity check circuit in units of n bits, and sequentially outputs the decoded data to the latch circuits, and wherein each of the data line driver sections drives corresponding one of the data lines after the decoded data has been stored in the latch circuits.

A third aspect of the present invention relates to an electronic instrument including:

any one of the above display drivers;

a display panel;

a scan driver which drives scan lines of the display panel;

a controller which controls the display driver and the scan driver; and a power supply circuit.

BRIEF DESCRIPTION OF THE SEVERAL VIEWS OF THE DRAWING

FIG. 13 is a table showing a relationship between 3-bit display data and 1-bit parity data in this embodiment.

DETAILED DESCRIPTION OF THE EMBODIMENT

Figure 1:
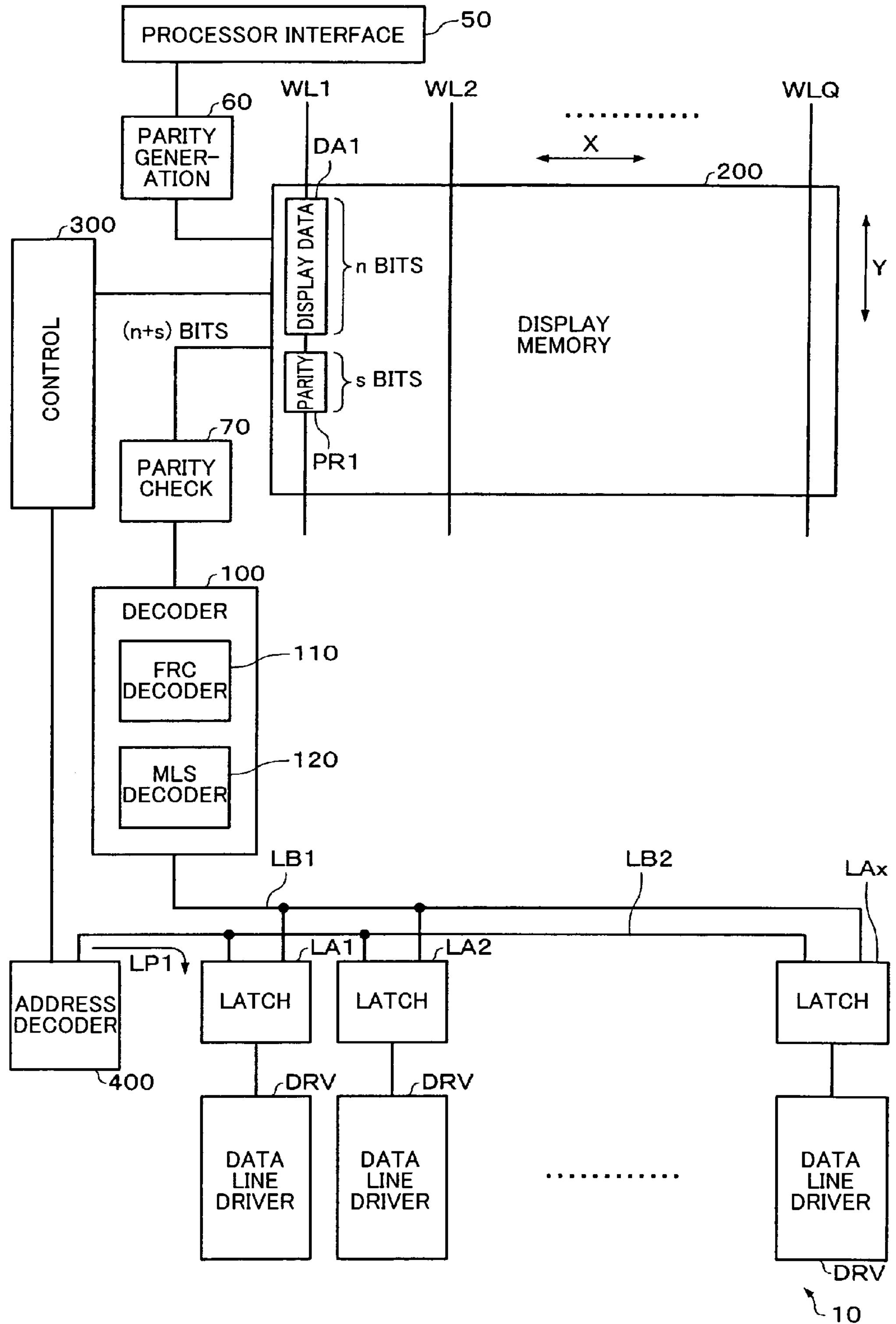
FIG. 1 is a block diagram of a display driver according to an embodiment of the present invention.

The present invention has been achieved in view of the above-described technical problem and may provide a display driver and an electronic instrument having a small layout area, excelling in cost performance, and capable of maintaining high display quality of a display panel.

One embodiment of the present invention provides a display driver including:

a parity generation circuit which generates s-bit (s is an integer of one or more) parity data for n-bit (n is an integer greater than one) display data input through a processor interface, combines the n-bit display data and the s-bit parity data, and outputs the combined n-bit display data and s-bit parity data to a display memory as (n+s)-bit display data;

a parity check circuit which performs data error detection for the (n+s)-bit display data sequentially input from the display memory in units of (n+s) bits, and outputs the n-bit display data;

at least one decoder which decodes the n-bit display data output from the parity check circuit;

a plurality of latch circuits which latch the data decoded by the decoder; and a plurality of data line driver sections which drive data lines of a display panel based on the data latched by the latch circuits.

According to this embodiment, the s-bit parity data can be generated when storing the n-bit display data in the display memory, and the s-bit parity data can be written into the display memory. The parity check circuit can detect a data error in the n-bit display data based on the n-bit display data and the s-bit parity data.

With this display driver, the (n+s)-bit display data may be read from the display memory and be output to the parity check circuit by performing a wordline control for the display memory once, the decoder may decode the n-bit display data sequentially output from the parity check circuit in units of n bits, and may sequentially output the decoded data to the latch circuits, and each of the data line driver sections may drive corresponding one of the data lines after the decoded data has been stored in the latch circuits.

According to this embodiment, since it is unnecessary to provide the decoders for each of the data line driver sections, the number of decoders can be reduced.

With this display driver, the parity generation circuit may generate the s-bit parity data based on a sum of a value of each bit of the n-bit display data so that a sum of a value of each bit of the (n+s)-bit display data becomes an even number or an odd number, and may output the (n+s)-bit display data to the display memory.

This enables the s-bit parity data to be written into the display memory.

With this display driver, when the sum of a value of each bit of the (n+s)-bit display data output from the parity generation circuit is an even number, the parity check circuit may output a data error signal to the processor interface when the sum of a value of each bit of the (n+s)-bit display data output from the display memory is an odd number, and wherein, when the sum of a value of each bit of the (n+s)-bit display data output from the parity generation circuit is an odd number, the parity check circuit may output the data error signal to the processor interface when the sum of a value of each bit of the (n+s)-bit display data output from the display memory is an even number.

This enables a data error to be detected when a data error has occurred in the display data output from the display memory.

With this display driver, when a value held in a memory cell is more frequently rewritten as “0” than “1” upon occurrence of a malfunction of a transistor connected with a wordline of the memory cell of the display memory, the s-bit parity data may be set so that the sum of a value of each bit of the (n+s)-bit display data output from the parity generation circuit is an odd number, and when the held value is more frequently rewritten as “1” than “0” upon occurrence of a malfunction of a transistor connected with a wordline of the memory cell of the display memory, the s-bit parity data may be set so that the sum of a value of each bit of the (n+s)-bit display data output from the parity generation circuit is an even number.

Another embodiment of the present invention provides a display driver including:

a parity check circuit which performs data error detection for (n+s)-bit display data (n is an integer greater than one, and s is an integer of one or more) sequentially input in units of (n+s) bits from a display memory and outputs n-bit display data, the display memory storing the (n+s)-bit display data in which s-bit parity data generated based on the n-bit display data and the n-bit display data are combined;

at least one decoder which decodes the n-bit display data output from the parity check circuit;

a plurality of latch circuits which latch the data decoded by the decoder; and a plurality of data line driver sections which drive data lines of a display panel based on the data latched by the latch circuits, wherein the (n+s)-bit display data is read from the display memory and output to the parity check circuit by performing a wordline control for the display memory once, wherein the decoder decodes the n-bit display data sequentially output from the parity check circuit in units of n bits, and sequentially outputs the decoded data to the latch circuits, and wherein each of the data line driver sections drives corresponding one of the data lines after the decoded data has been stored in the latch circuits.

According to this embodiment, the parity check circuit can detect a data error in the n-bit display data based on the n-bit display data and the s-bit parity data.

With any of these display drivers, the s-bit parity data may be generated based on a sum of a value of each bit of the n-bit display data so that a sum of a value of each bit of the (n+s)-bit display data becomes an even number or an odd number, and the (n+s)-bit display data may be stored in the display memory.

With any of these display drivers, when the sum of a value of each bit of the (n+s)-bit display data stored in the display memory is an even number, the parity check circuit may output a data error signal when the sum of a value of each bit of the (n+s)-bit display data output from the display memory is an odd number when reading the data from the display memory, and when the sum of a value of each bit of the (n+s)-bit display data stored in the display memory is an odd number, the parity check circuit may output a data error signal when the sum of a value of each bit of the (n+s)-bit display data output from the display memory is an even number when reading the data from the display memory.

With any of these display drivers, the parity check circuit may output the n-bit display data to the decoder irrespective of whether or not a data error has been detected during the data error detection for the (n+s)-bit display data.

This enables the display driver to drive the display panel without causing the display quality of the display panel to deteriorate even if a data error has been detected.

With any of these display drivers, when a value held in a memory cell is more frequently rewritten as "0" than "1" upon occurrence of a malfunction of a transistor connected with a wordline of the memory cell of the display memory, the s-bit parity data may be set so that the sum of a value of each bit of the (n+s)-bit display data stored in the display memory is an odd number, and when the held value is more frequently rewritten as "1" than "0" upon occurrence of a malfunction of a transistor connected with a wordline of the memory cell of the display memory, the s-bit parity data may be set so that the sum of a value of each bit of the (n+s)-bit display data stored in the display memory is an even number.

Any of these display drivers may include an address decoder which generates a latch pulse for the latch circuits to latch output from the decoder, and the address decoder may select one of the latch circuits based on address information on the display memory when the n-bit display data is read, and may output the latch pulse to the selected latch circuit.

According to this embodiment, since the latch circuit corresponding to the address information when reading the display data from the display memory can latch the output from the decoder, the data line indicated by the display data can be driven.

With any of these display drivers, the n-bit display data may be read from the display memory in synchronization with one of a rising edge and a falling edge of a clock signal from a control circuit, and the address decoder may output the latch pulse in synchronization with the other of the rising edge and the falling edge of the clock signal.

According to this embodiment, since the latch pulse output timing from the address decoder and the display data read timing from the display memory can be caused to differ according to the clock signal, the address decoder can output the latch pulse to the latch circuit indicated by the data decoded by the decoder.

With any of these display drivers, a shift register may be formed by the latch circuits by connecting the latch circuits in series and connecting an output terminal of one of the latch circuits with an input terminal of one of the latch circuits in a subsequent stage, and the shift register may shift data sequentially input from the decoder to one of the latch circuits in a first stage and stores the shifted data.

According to this embodiment, since the data decoded by the decoder can be sequentially stored in each latch circuit of the shift register by forming the shift register using the latch circuits, the decoded data can be stored in each latch circuit corresponding to each data line driver section without performing complicated processing.

With any of these display drivers, the decoder may include a multi-line select drive decoder, and the multi-line select drive decoder may generate drive voltage select data for selecting a drive voltage from among a plurality of drive voltages for a multi-line select drive of scan lines based on display data for m (m is an integer greater than one) pixels extracted from the n-bit display data, and may output the drive voltage select data to the latch circuits.

This enables the number of multi-line select drive decoders to be smaller than the latch circuits, whereby a display driver having a small circuit area can be provided.

With any of these display drivers, each of the data line driver sections may select a data line drive voltage from among the drive voltages based on the drive voltage select data stored in one of the latch circuits, and the data line driver sections may drive the data lines by using the data line drive voltage.

This enables the multi-line select drive to be performed for the display panel by storing the drive voltage select data in the latch circuits.

With any of these display drivers, the decoder may include a grayscale decoder, and the grayscale decoder may determine a display pattern of a pixel indicated by the n-bit display data based on the n-bit display data and frame information.

This enables a grayscale representation based on the n-bit display data to be performed.

With any of these display drivers, the grayscale decoder may output data "0" or "1" to at least one of the latch circuits based on the display pattern.

With any of these display drivers, the decoder further may include a multi-line select drive decoder for a multi-line select drive method which simultaneously selects and drives m (m is an integer greater than one) scan lines, and the multi-line select drive decoder may output drive voltage select data for selecting a data line drive voltage for driving the data line to the latch circuits based on the display pattern determined by the grayscale decoder.

This enables a grayscale representation and a multi-line select drive based on the n-bit display data to be performed for the display panel.

With any of these display drivers, each of the data line driver sections may select the data line drive voltage from among a plurality of types of drive voltages for a multi-line select drive of scan lines based on the drive voltage select data stored in one of the latch circuits, and each of the data line driver sections may drive the data line using the data line drive voltage.

With any of these display drivers, a grayscale of each pixel in display data for m pixels extracted from the n-bit display data may be indicated by k-bit (k is an integer greater than one) grayscale data, the grayscale decoder may include a grayscale ROM for determining a grayscale pattern which indicates two types of display states based on the k-bit grayscale data and the frame information, the grayscale decoder may determine the grayscale pattern for each of the m pixels based on the grayscale ROM, and may output m-bit display data which indicates the display state of each of the m pixels by "0" or "1" based on the determined grayscale pattern to the multi-line select drive decoder, and the multi-line select drive decoder may generate the drive voltage select data based on the m-bit display data, and may output the drive voltage select data to the latch circuits.

A further embodiment of the present invention provides an electronic instrument including:

any one of the above display drivers;

a display panel;

a scan driver which drives scan lines of the display panel;

a controller which controls the display driver and the scan driver; and a power supply circuit.

The embodiments of the present invention are described below with reference to the drawings. Note that the embodiments described hereunder do not in any way limit the scope of the invention defined by the claims laid out herein. Note also that not all of the elements of these embodiments should be taken as essential requirements to the means of the present invention.

1. Display Driver

FIG. 1 is a block diagram of a display driver 10. In this embodiment, the display driver 10 includes a processor interface 50, a parity generation circuit 60, a parity check circuit 70, a decoder 100, a display memory 200, a control circuit 300, an address decoder 400, a plurality of data line driver sections DRV, and a plurality of latch circuits LA1 to LAx (x is an integer greater than one). However, the present invention is not limited thereto. For example, some of the above-mentioned circuits may be omitted from the display driver 10, or the display driver 10 may include another circuit. For example, one of the processor interface 50, the parity generation circuit 60, the parity check circuit 70, the decoder 100, the display memory 200, the control circuit 300, and the address decoder 400 may be omitted from the display driver 10.

The processor interface 50 is an interface to which a control device such as a processor is connected. When writing display data into the display memory 200, the processor or the like outputs the display data to the display memory 200 through the processor interface 50.

The decoder 100 includes an FRC decoder (grayscale decoder in a broad sense) 110 and an MLS decoder (multi-line select drive decoder in a broad sense) 120. However, the present invention is not limited thereto. For example, the FRC decoder 110 or the MLS decoder 120 may be omitted from the decoder 100. The FRC decoder 110 uses a frame rate control (FRC) method as a grayscale display method. The FRC decoder 110 in this embodiment can perform a four-grayscale representation by using 2-bit grayscale data (k-bit grayscale data in a broad sense) for each pixel. However, the present invention is not limited thereto. For example, a 16-grayscale representation may be performed by setting the data length of the grayscale data to four bits. It suffices to set the data length of the grayscale data for the FRC decoder 110 corresponding to the number of grayscales necessary for a desired grayscale representation. The MLS decoder 120 uses a multi-line select (MLS) drive method as a drive method. The MLS decoder 120 in this embodiment performs a four-line select drive for scan lines of a display panel, for example. However, the present invention is not limited thereto. For example, the number of simultaneously selected lines may be arbitrarily set, such as a three-line select drive or a five- to eight-line select drive. This embodiment can also deal with a color display, and one pixel in this embodiment may be set to one of an R pixel, a G pixel, and a B pixel in RGB color display.

When writing n-bit display data into the display memory 200, the n-bit display data is input to the parity generation circuit 60 through the processor interface 50. The parity generation circuit 60 generates s-bit parity data based on the n-bit display data input thereto, and outputs the n-bit display data and the s-bit parity data to the display memory 200. Specifically, the n-bit display data and the s-bit parity data are stored in the display memory 200. For example, when n-bit display data DA1 is input to the parity generation circuit 60, the parity generation circuit 60 outputs the n-bit display data DA1 and s-bit parity data PR1 to the display memory 200. In this case, a wordline WL1 of the display memory 200 is selected, and the n-bit display data DA1 and the s-bit parity data PR1 are stored in the display memory 200 as shown in FIG. 1. The display data for displaying an image on the display panel is thus stored in the display memory 200.

The display data stored in the display memory 200 is read when displaying an image on the display panel based on the display data stored in the display memory 200. When reading the display data from the display memory 200, the display memory 200 receives a control signal from the control circuit 300. The control signal from the control circuit 300 includes a select signal (address information on the display memory in a broad sense) which selects one of the wordlines of the display memory 200. For example, the wordline WL1 is selected based on the select signal included in the control signal, whereby the n-bit display data DA1 and the s-bit parity data PR1 are read from the display memory 200. The n-bit display data DA1 and the s-bit parity data PR1 read from the display memory 200 are input to the parity check circuit 70. The parity check circuit 70 receives the n-bit display data DA1 and the s-bit parity data PR1 from the display memory 200, and performs data error detection for the n-bit display data DA1. When an error in the n-bit display data DA1 has been detected by the data error detection, the parity check circuit 70 outputs a data error signal to the control circuit 300, for example. The parity check circuit 70 outputs the n-bit display data DA1 to the decoder 100 irrespective of whether or not an error in the n-bit display data DA1 has been detected. However, the present invention is not limited thereto.

As described above, at least one piece of display data DA1 can be read from the display memory 200 when one wordline is selected. In this embodiment, the wordline is formed in the display memory 200 along a direction Y, for example. A plurality of wordlines WL1 to WLQ (Q is an integer greater than one) are arranged in the display memory 200 along a direction X. However, the present invention is not limited thereto. For example, the number of wordlines may be one.

The display data DA1 includes grayscale data for a plurality of pixels (m pixels in a broad sense; m is an integer greater than one), for example.

The decoder 100 decodes the n-bit display data DA1 read from the display memory 200.

The FRC decoder 110 decodes the grayscale data for m pixels included in the n-bit display data DA1.

The MLS decoder 120 generates drive voltage select data based on the processing result from the FRC decoder 110, and outputs the drive voltage select data to the latch circuits LA1 to LAx. In the case where the number of simultaneously selected lines is set to four in the MLS drive method, since the number of types of voltages used in the data line driver section DRV is five, it suffices that the drive voltage select data be 3-bit data.

The address decoder 400 receives the select signal (address information on the display memory) which selects the wordline, for example. The address decoder 400 selects one of the latch circuits LA1 to LAx based on the select signal, and outputs a latch pulse to the selected latch circuit. The latch circuit which has received the latch pulse latches the drive voltage select data. The latch pulse may be output without using the select signal (address information).

For example, when the wordline WL1 of the display memory 200 is selected, the n-bit display data DA1 is input to the decoder 100 through the parity check circuit 70. The n-bit display data DA1 is decoded by the decoder 100, and the decoded data is output to a bus LB1 as the drive voltage select data. The select signal which selects the wordline WL1 is output to the address decoder 400, for example. The address decoder 400 outputs a latch pulse LP1 to the latch circuit LA1 through a bus LB2 based on the signal which selects the wordline WL1. Specifically, the latch circuit LA1 latches the drive voltage select data obtained by decoding the display data DA1. This data latch operation is sequentially performed by sequentially selecting the wordlines WL1 to WLQ.

The data line driver sections DRV drive data lines of the display panel based on the drive voltage select data stored in the latch circuits LA1 to LAx. In other drawings, sections indicated by the same symbols have the same meanings.

Figure 2:
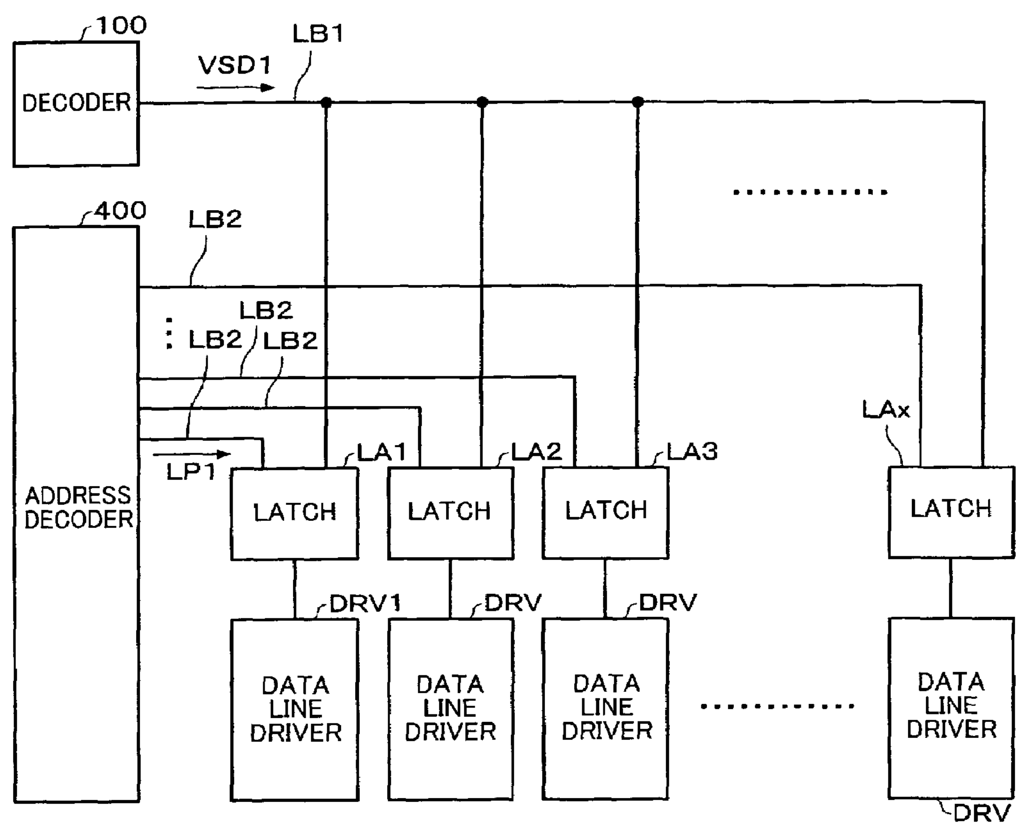
FIG. 2 shows a connection between an address decoder and a plurality of latch circuits according to this embodiment.

FIG. 2 shows a connection between the address decoder 400 and the latch circuits LA1 to LAx. In the case where a data line driver section DRV1 drives the data line corresponding to the display data DA1, the drive voltage select data generated by decoding the display data DA1 is stored in the latch circuit LA1. The decoder 100 generates drive voltage select data VSD1 by decoding the display data DA1, and outputs the drive voltage select data VSD1 to the latch circuits LA1 to LAx through the bus LB1, as shown in FIG. 2. Since the address decoder 400 receives the control signal from the control circuit 300 and outputs the latch pulse LP1 only to the latch circuit LA1 corresponding to the display data DA1, the drive voltage select data VSD1 is latched by the latch circuit LA1. Since the select signal which selects the wordline of the display memory 200 is included in the control signal from the control circuit 300, the address decoder 400 can output the latch pulse to the latch circuit LA1 corresponding to the display data DA1 upon receiving the control signal from the control circuit 300.

Figure 3:
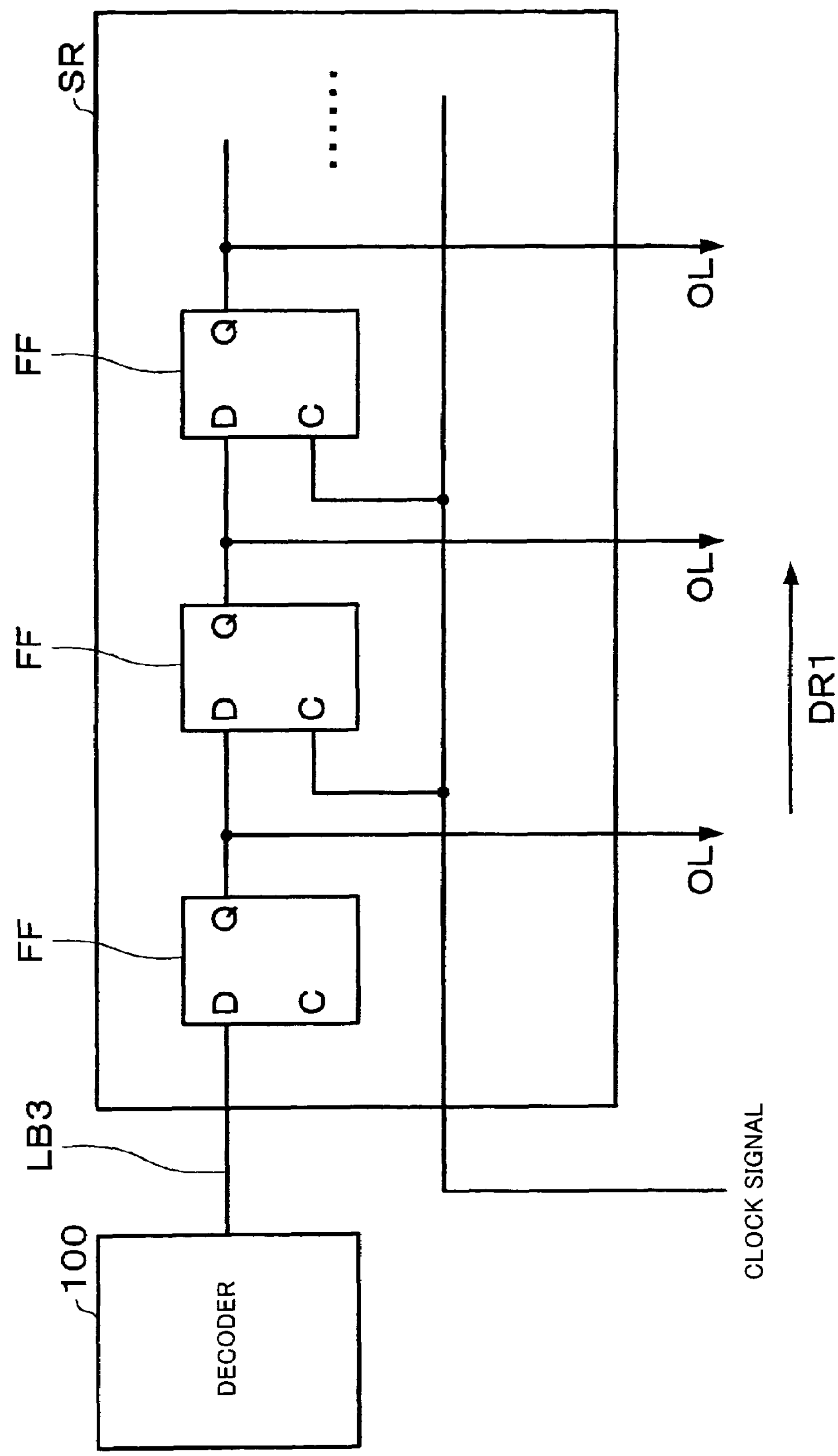
FIG. 3 shows a part of a shift register according to this embodiment.

A shift register may be used instead of the address decoder 400 and the latch circuits LA1 to LAx. FIG. 3 shows a part of a configuration of a shift register SR. The shift register SR is formed by connecting a plurality of flip-flops FF (latch circuits in a broad sense) in series. A data output Q (output terminal in a broad sense) of the flip-flop FF in the preceding stage is connected with a data input D (input terminal in a broad sense) of the flip-flop FF in the subsequent stage. The drive voltage select data is input to the shift register SR from the decoder 100 through a bus LB3. The data stored in each flip-flop FF is shifted to the right in a direction DR1 in synchronization with a clock signal input to a clock input C of each flip-flop FF. An output line OL provided between each flip-flop FF is connected with the data line driver section DRV through a line latch circuit or the like. The drive voltage select data is stored in the line latch circuit or the like by outputting the latch pulse to the line latch circuit or the like after the data for one scan line has been stored in the shift register SR. This enables the data line driver section DRV to drive the data line based on the drive voltage select data stored in the line latch circuit or the like.

Figure 4:
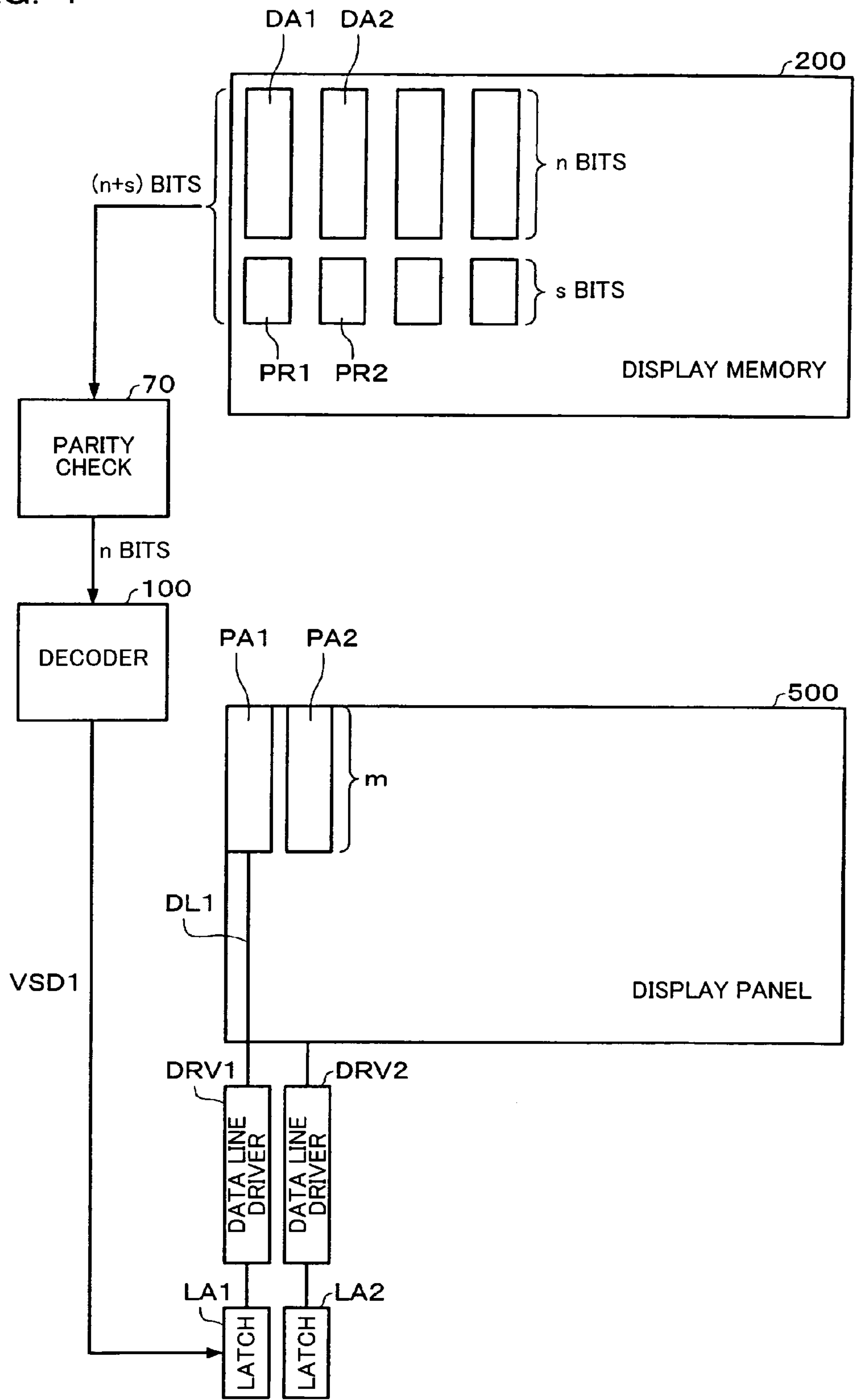
FIG. 4 shows a relationship between display data stored in a display memory according to this embodiment and pixels of a display panel.

FIG. 4 shows the relationship between the display data stored in the display memory 200 and pixels of a display panel 500. For example, when the wordline WL1 shown in FIG. 1 is selected, the n-bit display data DA1 and the s-bit parity data PR1 are input to the parity check circuit 70. The parity check circuit 70 performs data error detection for the (n+s)-bit display data input thereto, and outputs the n-bit display data DA1 to the decoder 100. The n-bit display data DA1 is decoded by the decoder 100, and stored in the latch circuit LA1 as the drive voltage select data VSD1. The data line driver section DRV1 drives the data line DL1 based on the drive voltage select data VSD1. In this case, simultaneously selected m pixels PA1 are voltage-controlled through the data line DL1. Specifically, the display data DA1 in the display memory 200 corresponds to the m pixels PA1 of the display panel 500. Likewise, display data DA2 in the display memory 200 corresponds to m pixels PA2 of the display panel 500.

In the case of using k-bit (k is an integer of one or more) grayscale data for one pixel, the n-bit display data DA1 obtained by selecting the wordline WL1 is made up of (k×m) bits in order to display the m pixels PA1. Specifically, (k×m)-bit display data is output to the decoder 100 by selecting one wordline of the display memory 200, and decode processing for displaying the m pixels on the display panel 500 is performed by the decoder 100.

2. Decoder

Figure 5:
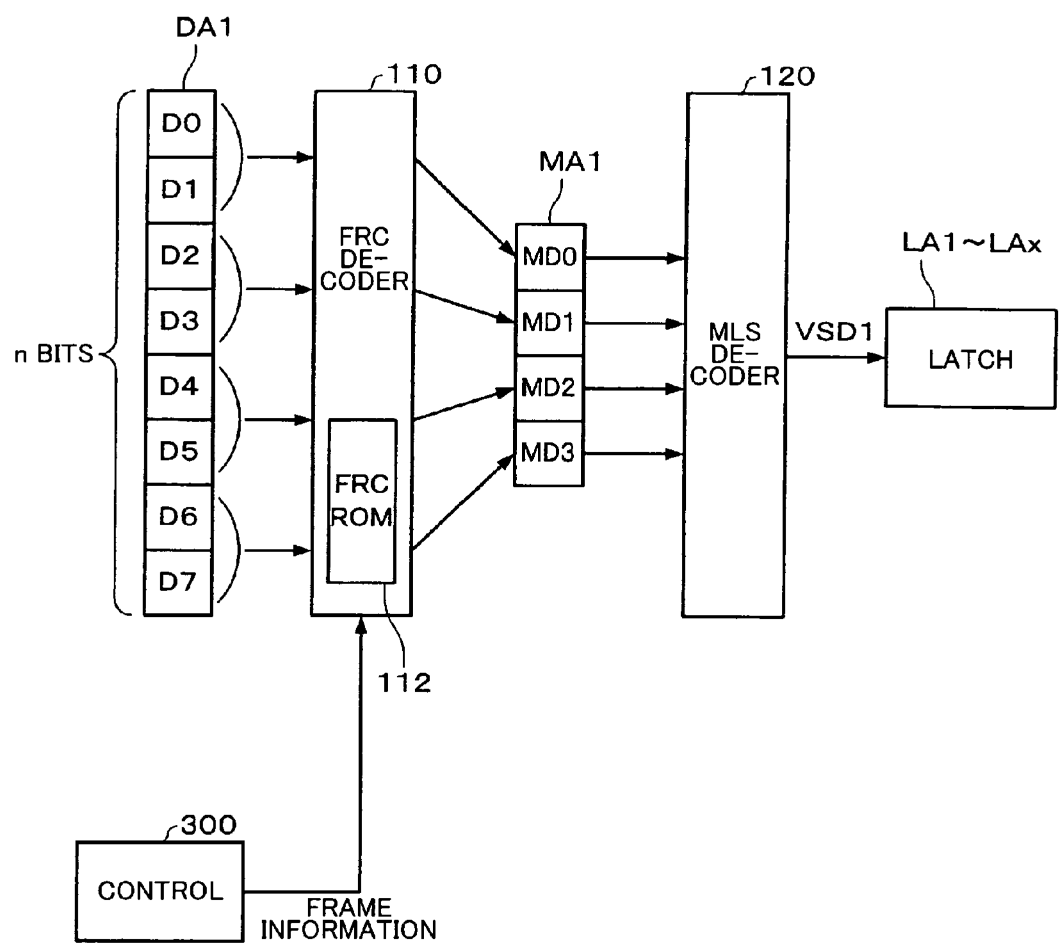
FIG. 5 is a block diagram illustrative of operations of an FRC decoder and an MLS decoder.

FIG. 5 is a block diagram illustrative of the operations of the FRC decoder 110 and the MLS decoder 120. FIG. 5 shows the case where the n-bit display data is the 8-bit display data DA1, for example. Symbols D0 to D7 indicate data of each bit of the 8-bit display data DA1. Since the decoder 100 in this embodiment uses a four-grayscale representation and a four-line select drive method (multi-line select drive method which simultaneously selects and drives m scan lines in a broad sense), the 8-bit display data DA1 includes display data for four pixels, and the grayscale of each of the four pixels is indicated by 2-bit grayscale data. The target four pixels of the 8-bit display data DA1 are called first to fourth pixels. Specifically, the data D0 and D1 of the display data DA1 is the grayscale data for the first pixel, and the data D2 and D3 is the grayscale data for the second pixel. The data D4 to D7 of the display data DA1 is the grayscale data for the third and fourth pixels.

The 8-bit display data DA1 is decoded by the FRC decoder 110. The FRC decoder 110 includes an FRCROM 112 (grayscale ROM in a broad sense). However, the present invention is not limited thereto. The FRC decoder 110 receives frame information from the control circuit 300. A frame number when the display data DA1 is decoded is included in the frame information. The FRCROM 112 is a storage circuit which stores a display pattern table for determining 1-bit data (display pattern in a broad sense) for each pixel based on the frame number and the pixel grayscale data.

The FRC decoder 110 outputs 4-bit (m-bit in a broad sense) display data MA1 (display data for m pixels in a broad sense) from the frame information and the grayscale data D0 to D7 for the first to fourth pixels based on the display pattern table (see FIG. 7) stored in the FRCROM 112. In FIG. 5, symbols MD0 to MD3 indicate data of each bit of the display data MA1.

The MLS decoder 120 generates the drive voltage select data VSD1 by decoding the 4-bit display data MA1, and outputs the drive voltage select data VSD1 to the latch circuits LA1 to LAx. The drive voltage select data VSD1 is latched by the latch circuit LA1 among the latch circuits LA1 to LAx which has received the latch pulse LP1 from the address decoder 400, for example.

Figure 6:
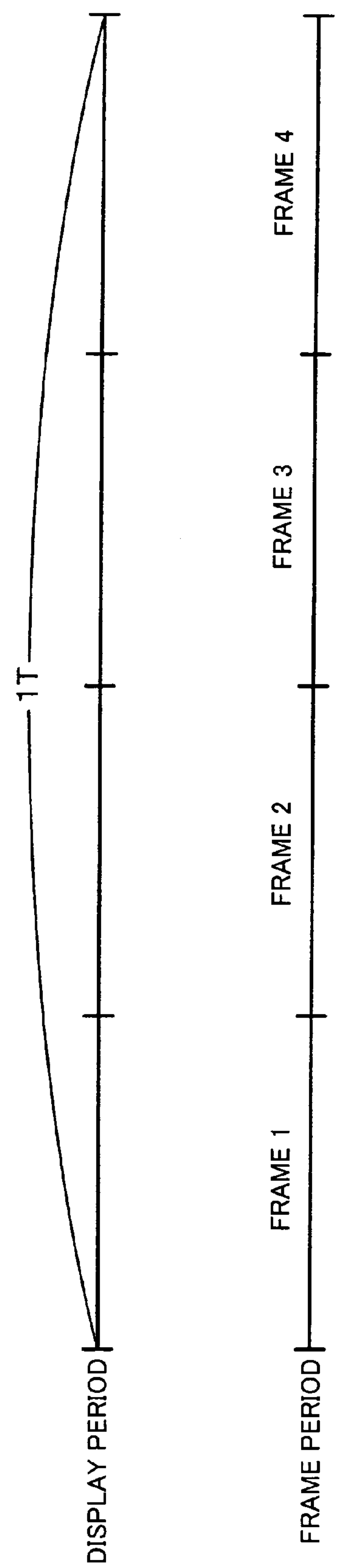
FIG. 6 shows a relationship among a display period, a frame period, and a field period according to this embodiment.

In the FRC grayscale method (frame grayscale method), when a display period in which one frame is displayed is a display period 1T, the display period 1T is divided into a plurality of frame periods, and whether or not to display a pixel is controlled in each frame period. The FRC grayscale method realizes a grayscale representation by adjusting the number of frame periods in which a pixel is displayed. The frame number included in the above-mentioned frame information is a number for alternatively indicating each frame period. FIG. 6 shows an example in which the display period 1T is divided into four frame periods. In the case of performing a four-grayscale representation, when the 2-bit grayscale data is (11), a pixel is displayed in all of frame periods 1 to 4 shown in FIG. 6, for example. When the 2-bit grayscale data is (01), a pixel is displayed in one of the frame periods 1 to 4 shown in FIG. 6, for example.

Since the four-line select drive is performed in this embodiment, the data decoded by the FRC decoder 110 is decoded by the MLS decoder 120, for example. In this case, each of the frame periods 1 to 4 includes four field periods F1 to F4. The drive voltage select data is generated in each field period based on the data decoded by the FRC decoder 110 in each frame period, whereby the four-line select drive is performed.

Figures 7, 8:
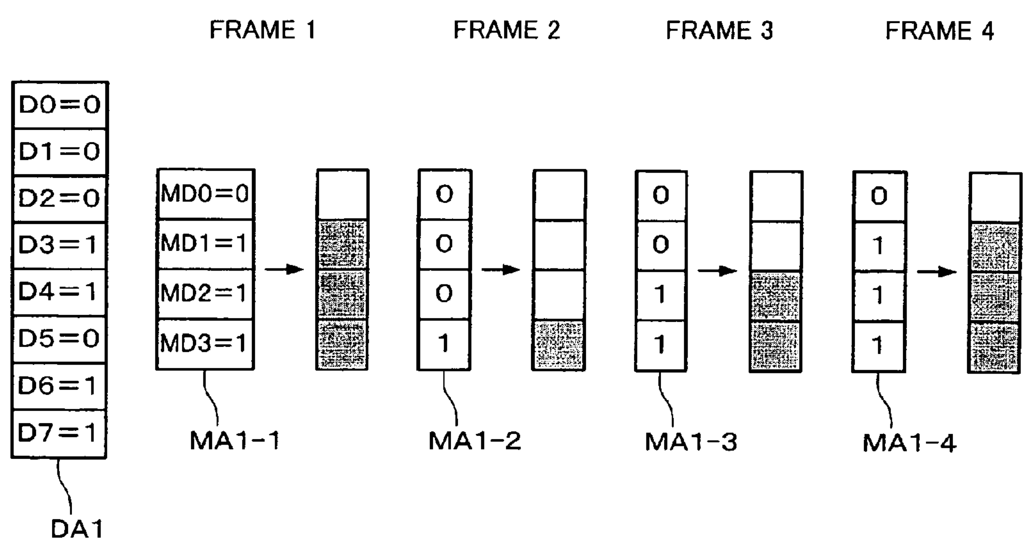
FIG. 7 shows an example of a display pattern table according to this embodiment.
FIG. 8 is illustrative of an operation of an FRC decoder according to this embodiment.

FIG. 7 shows an example of the display pattern table. The FRC decoder 110 outputs the display data MA1 according to the display pattern table stored in the FRCROM 112. The display pattern table is a table for determining a 1-bit value based on the frame number and the grayscale data as shown in FIG. 7, for example. When decoding the display data in the frame period 1 shown in FIG. 6, specifically, when the frame number is “1”, a value “0” is output for the pixel grayscale data (00). When the frame number is “4”, a value “0” is output for the pixel grayscale data (00), and a value “1” is output for the pixel grayscale data (10).

Display data MA1-1 to MA1-4 shown in FIG. 8 indicates the display data MA1 which is decoded and output in each frame period when the values of the data D0 to D7 of the display data DA1 are (00011011), for example. In the frame period 1, the values of the data MD0 to MD3 of the display data MA1-1 are decoded and output as (0111) according to the display pattern table shown in FIG. 7. In the frame period 2, the values of the data MD0 to MD3 of the display data MA1-2 are output as (0001). Likewise, the values of the data MD0 to MD3 of the display data MA1-3 and MA1-4 are output as (0011) and (0111), respectively.

FIG. 8 shows that a pixel is displayed when the value of each piece of data of the display data is “1”, and a pixel is not displayed when the value of each piece of data is “0”. However, “1” and “0” may be reversed.

A flow in which the n-bit display data from the display memory 200 is sequentially decoded and the drive voltage select data is output to the latch circuits LA1 to LAx is described below using FIGS. 9 and 10.

Figure 9:
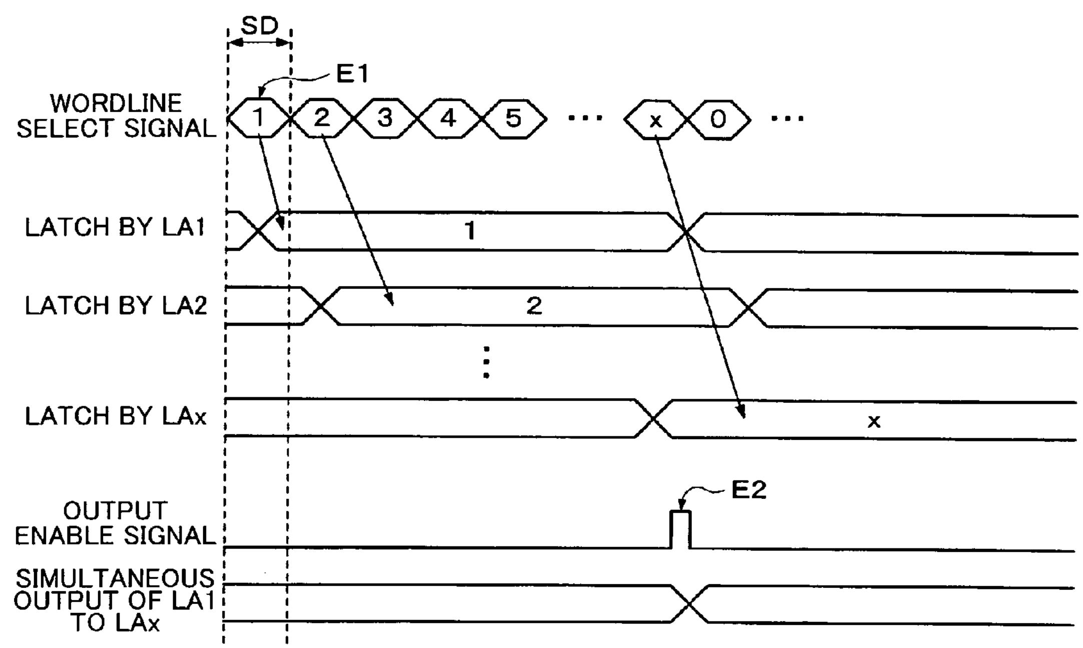
FIG. 9 is a timing chart when a latch pulse is input to a latch circuit according to this embodiment.

FIG. 9 is a timing chart when the latch pulse is input to the latch circuits LA1 to LAx. A wordline select signal is the select signal (address information on the display memory in a broad sense) for selecting one of the wordlines of the display memory 200. The drive voltage select data is latched by the latch circuit LA1 based on the wordline select signal indicated by a symbol E1. The wordlines WL1 to WLQ of the display memory 200 are sequentially selected, whereby the drive voltage select data is latched by the latch circuits LA1 to LAx. After the drive voltage select data has been latched by the latch circuits LA1 to LAx, an output enable signal indicated by a symbol E2 is output to the data line driver sections DRV, and the data lines are driven by the data line driver sections DRV.

Figure 10:
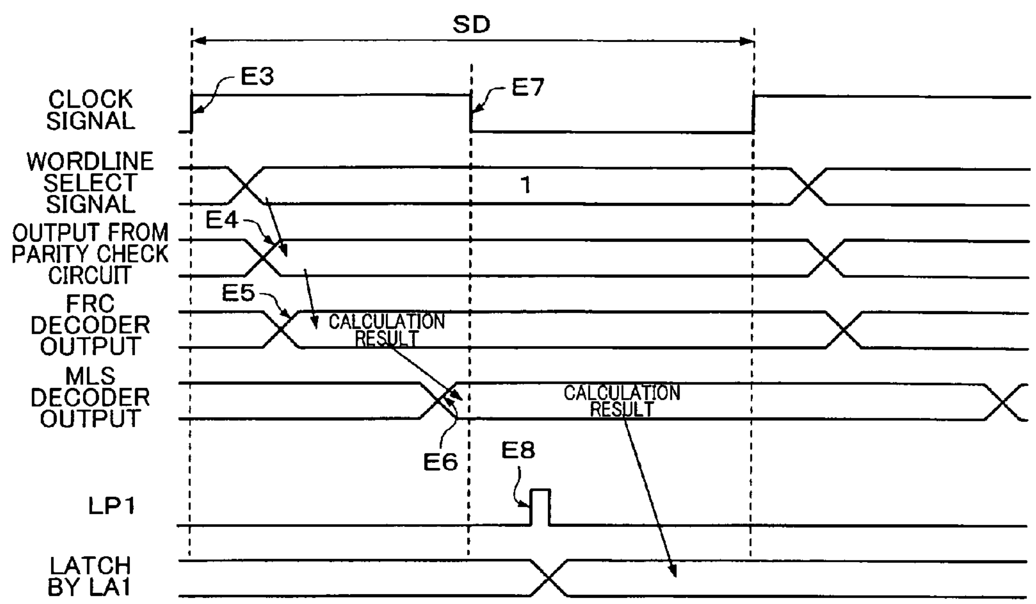
FIG. 10 is a timing chart showing details of a part of a period shown in FIG. 9.

FIG. 10 is an enlarged timing chart of the period indicated by a symbol SD shown in FIG. 9. The period SD corresponds to one cycle of the clock signal, for example. The wordline select signal is output to the display memory 200 from the control circuit 300 in synchronization with the rising edge of the clock signal indicated by a symbol E3. In the display memory 200, the wordline WL1 is selected based on the wordline select signal, for example. This causes the n-bit display data DA1 and the s-bit parity data PR1 to be input to the parity check circuit 70 at the timing indicated by a symbol E4, and data error detection is performed, for example. The n-bit display data DA1 is input to the FRC decoder 110 from the parity check circuit 70 at the timing indicated by a symbol E5, and is decoded by the FRC decoder 110, for example. The data decoded by the FRC decoder 110 is input to the MLS decoder 120 at the timing indicated by a symbol E6, and is decoded by the MLS decoder 120, for example. The data decoded by the MLS decoder 120 is output to the latch circuits LA1 to LAx as the drive voltage select data VSD1, for example.

The latch pulse LP1 indicated by a symbol E8 is output to the latch circuit LA1 from the address decoder 400 in synchronization with the falling edge of the clock signal indicated by a symbol E7, for example. This enables the latch circuit LA1 to latch the drive voltage select data VSD1 generated by the MLS decoder 120.

The MLS decoder 120 has decoded the data output from the FRC decoder 110 in a period before the falling edge of the clock signal indicated by the symbol E7. Therefore, the MLS decoder 120 can output the drive voltage select data VSD1 at the timing of the falling edge of the clock signal indicated by the symbol E6.

The wordline select signal is output in synchronization with the rising edge of the clock signal, and the latch pulse LP1 is output in synchronization with the falling edge of the clock signal, for example. However, the present invention is not limited thereto. The wordline select signal may be output in synchronization with the falling edge of the clock signal, and the latch pulse LP1 may be output in synchronization with the rising edge of the clock signal, for example.

The wordline select signal may be output in synchronization with the rising edge of the clock signal, and the latch pulse LP1 may not be output in synchronization with the falling edge of the clock signal and may be generated after securing a period of time sufficient for the processing of the FRC decoder 110 and the MLS decoder 120 from the same rising edge of the clock signal as the wordline select signal by using a delay circuit, for example.

A feature that the rising/falling edge of the clock signal is in synchronization with the rising/falling edge of another signal includes the case where the time difference between the rising/falling edge of the clock signal and the rising/falling edge of another signal is uniform, and also includes the case where the rising/falling edge of another signal is set at the same time as the falling edge of the clock signal.

3. Display Memory

Figure 11:
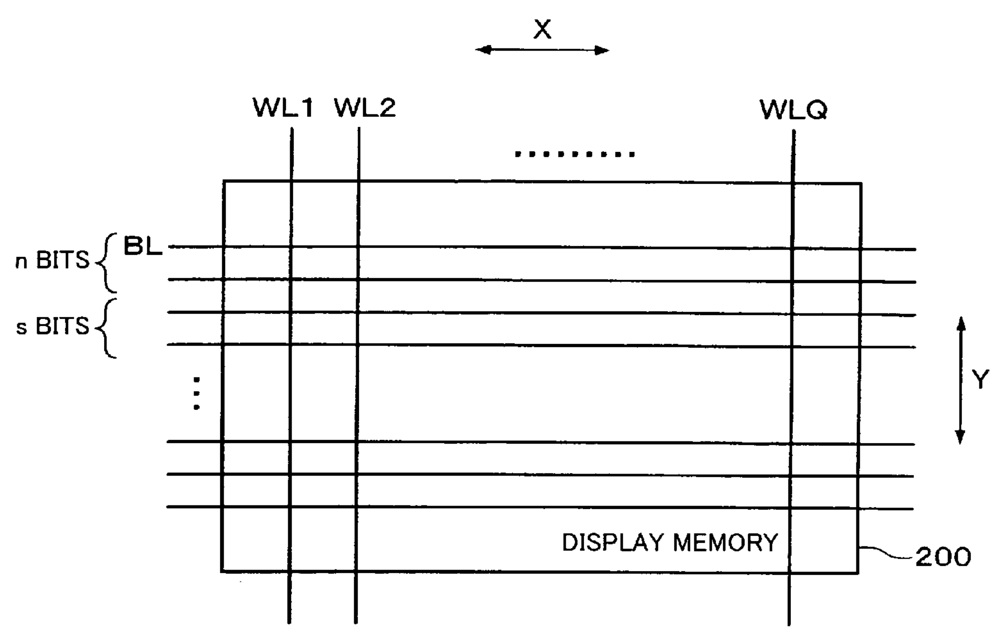
FIG. 11 shows a display memory according to this embodiment.

FIG. 11 shows the display memory 200. A plurality of bitlines BL are provided in the display memory 200. The bitlines BL are formed along the direction X. For example, when the wordline WL1 is selected, (n+s)-bit data is output through the bitlines BL.

Figure 12:
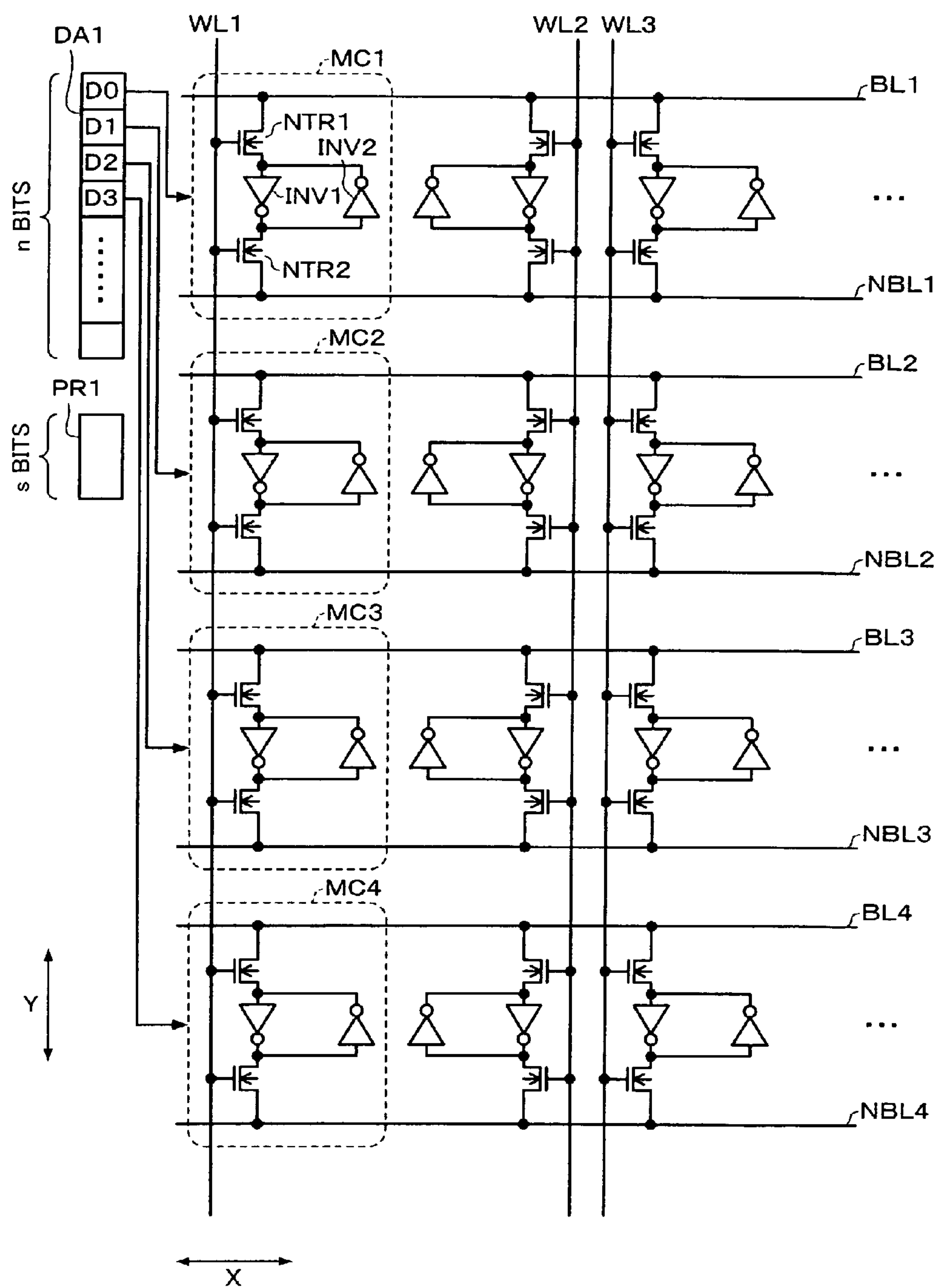
FIG. 12 shows a relationship between memory cells provided in a display memory according to this embodiment and display data.

FIG. 12 shows the relationship between a plurality of memory cells provided in the display memory 200 and the n-bit display data DA1. FIG. 12 shows a part of the display memory 200. An inversion signal obtained by reversing a signal input to each of bitlines BL1 to BL4 is input to each of bitlines NBL1 to NBL4, respectively. Each memory cell of the display memory 200 includes N-type transistors NTR1 and NTR2 and inverters INV1 and INV2. For example, data is read from and written into a memory cell MC1 through the bitlines BL1 and NBL1. Specifically, since data is input to and output from the memory cell MC1 through single system lines, the memory cell MC1 is called a one-port memory cell.

When the wordline WL1 is selected, the N-type transistors NTR1 and NTR2 of the memory cell MC1 are turned ON. This enables data to be read from the memory cell MC1 or data to be written into the memory cell MC1. The display data DA1 is stored in the display memory 200 in which such one-port memory cells are arranged. The data D0 of the n-bit display data DA1 is stored in the memory cell MC1, for example. The data D1 of the n-bit display data DA1 is stored in the memory cell MC2, for example. The data D2 and D3 of the display data DA1 is respectively stored in the memory cells MC3 and MC4, for example.

The s-bit parity data PR1 is stored in other s memory cells connected with the wordline WL1, for example. However, the illustration is omitted in FIG. 12. In the display memory 200, data of each bit of the n-bit display data DA1 and the s-bit parity data PR1 is stored in the memory cells connected with the wordline WL1 among the memory cells arranged along the direction Y, for example. Specifically, the n-bit display data DA1 and the s-bit parity data PR1 are output from the display memory 200 upon selection of the wordline WL1.

The display data DA1 stored in the display memory 200 is output to the decoder 100 by selecting the wordline WL1. For example, the data D0 of the display data DA1 can be read by reading outputs from the bitlines BL1 and NBL1 using a sense amplifier or the like. Likewise, the data D2 and D3 of the display data DA1 can be read by reading outputs from the bitlines BL2 to BL4 and the bitlines NBL2 to NBL4.

4. Parity Generation Circuit And Parity Check Circuit

The parity generation circuit 60 and the parity check circuit 70 operate in one of two parity modes. The two parity modes include an even parity mode and an odd parity mode. In these parity modes, a judgment is made as to whether the total number of bits of the n-bit display data and the s-bit parity data of which the value of the data is "1" is an even number or an odd number. In the even parity mode, the s-bit parity data is set so that the total number of bits of which the value of the data is "1" is an even number, for example. In the odd parity mode, the s-bit parity data is set so that the total number of bits of which the value of the data is "1" is an odd number, for example.

In the above example, the total number of bits of which the value of the data is "1" is used as the criterion. However, the present invention is not limited thereto. For example, the total number of bits of which the value of the data is "0" may be used as the criterion.

In FIGS. 13 to 17, the n-bit display data is illustrated as 3-bit display data and the s-bit parity data is illustrated as 1-bit parity data in order to describe the s-bit parity data. However, the present invention is not limited thereto.

FIG. 13 shows the relationship between the 3-bit display data and the 1-bit parity data. A parity mode PTY-MODE is data for indicating the even parity mode or the odd parity mode. When the value of the parity mode PTY-MODE is "0", the parity mode PTY-MODE indicates the even parity mode, for example. When the value of the parity mode PTY-MODE is "1", the parity mode PTY-MODE indicates the odd parity mode, for example. The data D0 to D2 indicate data of each bit of the 3-bit display data. Data PTY-BIT indicates the 1-bit parity data.

In FIG. 13, when the data D0 to D2 of each bit of the 3-bit display data is (000), the value of the parity data PTY-BIT is "0" in the even parity mode, and the value of the parity data PTY-BIT is "1" in the odd parity mode. When the data D0 to D2 of each bit of the 3-bit display data is (100), the value of the parity data PTY-BIT is "1" in the even parity mode, and the value of the parity data PTY-BIT is "0" in the odd parity mode.

Figure 14:
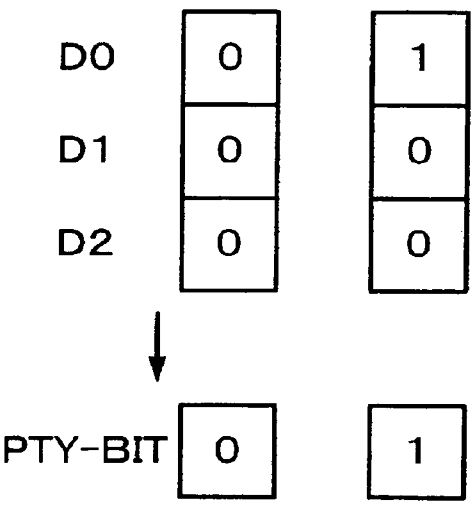
FIG. 14 shows data of each bit of 3-bit display data and parity data in an even parity mode in this embodiment.

FIG. 14 shows the data D0 to D2 of each bit of the 3-bit display data and the parity data PTY-BIT in the even parity mode. In the even parity mode, the value of the parity data PTY-BIT is set to "0" when the value of the data D0 to D2 is (000). Therefore, the total number of the data D0 to D2 and the parity data (PTY-BIT) of which the value of the data is "1" becomes zero (even number).

In the even parity mode, the value of the parity data PTY-BIT is set to "1" when the value of the data D0 to D2 is (100). Therefore, the total number of the data D0 to D2 and the parity data (PTY-BIT) of which the value of the data is "1" becomes two (even number).

Figure 15:
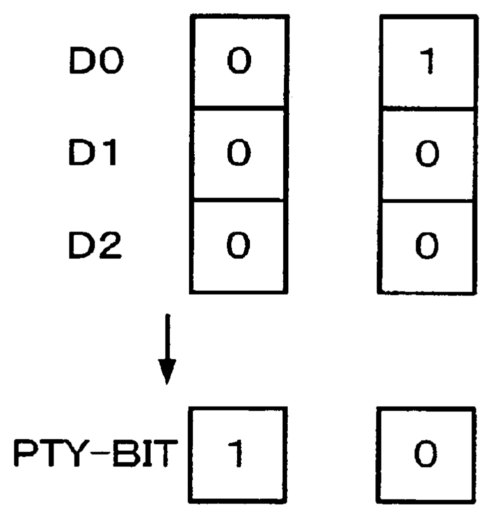
FIG. 15 shows data of each bit of 3-bit display data and parity data in an odd parity mode in this embodiment.

FIG. 15 shows the data D0 to D2 of each bit of the 3-bit display data and the parity data PTY-BIT in the odd parity mode. In the odd parity mode, the value of the parity data PTY-BIT is set to "1" when the value of the data D0 to D2 is (000). Therefore, the total number of the data D0 to D2 and the parity data (PTY-BIT) of which the value of the data is "1" becomes one (odd number).

In the odd parity mode, the value of the parity data PTY-BIT is set to "0" when the value of the data D0 to D2 is (100). Therefore, the total number of the data D0 to D2 and the parity data (PTY-BIT) of which the value of the data is "1" becomes one (odd number).

A situation in which the value of the data of each bit of the display data has all become either "0" or "1" due to malfunction or the like can be detected by setting the parity data PTY-BIT as described above, for example. In more detail, the parity check circuit 70 checks the n-bit display data and the s-bit parity data PTY-BIT, and determines the number of bits of which the value of the data is "1", for example. A situation in which the value of the data of each bit of the n-bit display data has all become either "0" or "1" can be detected by determining the number of bits, for example.

Figure 16:
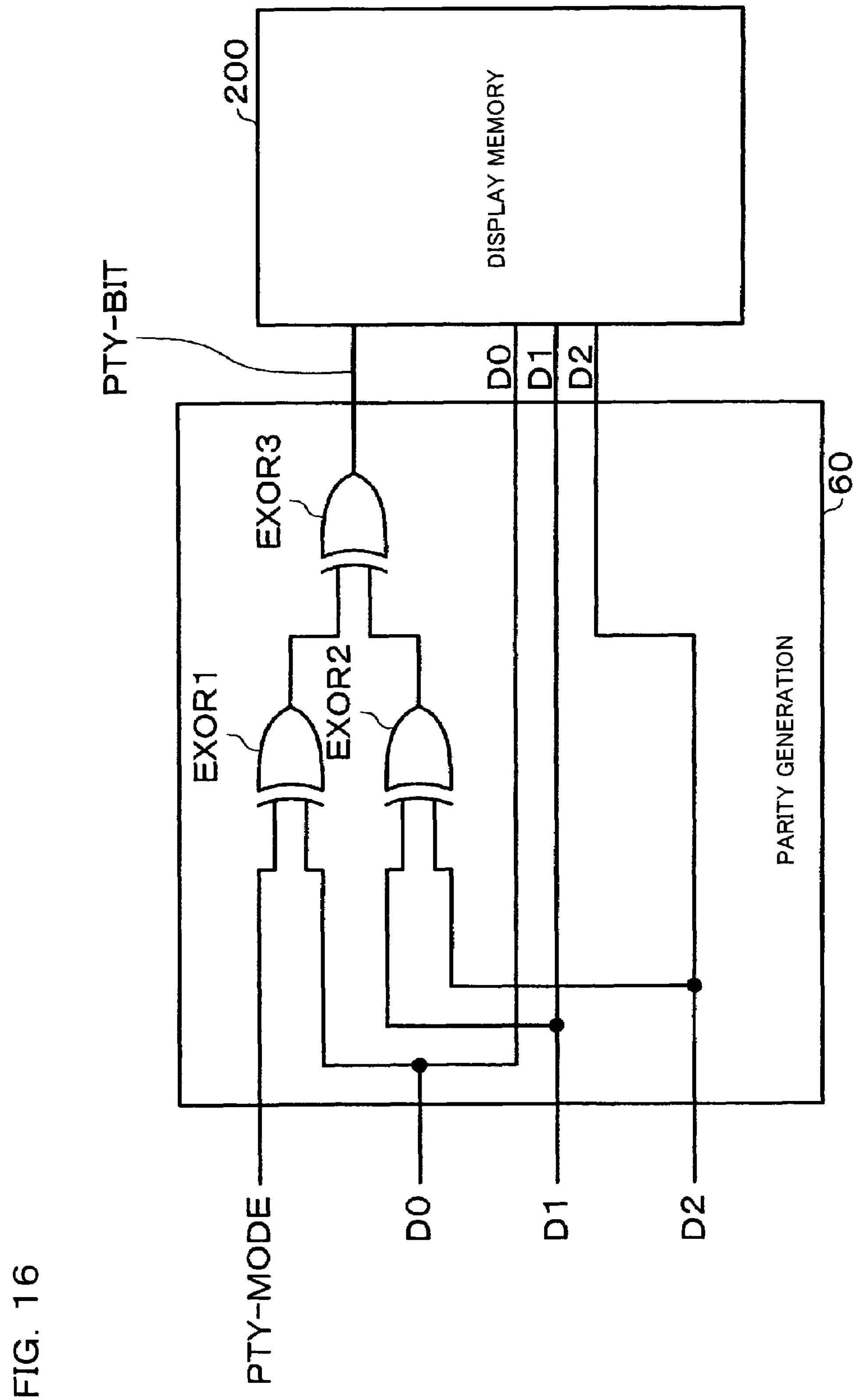
FIG. 16 is a circuit diagram showing a parity generation circuit in this embodiment.
Figure 17:
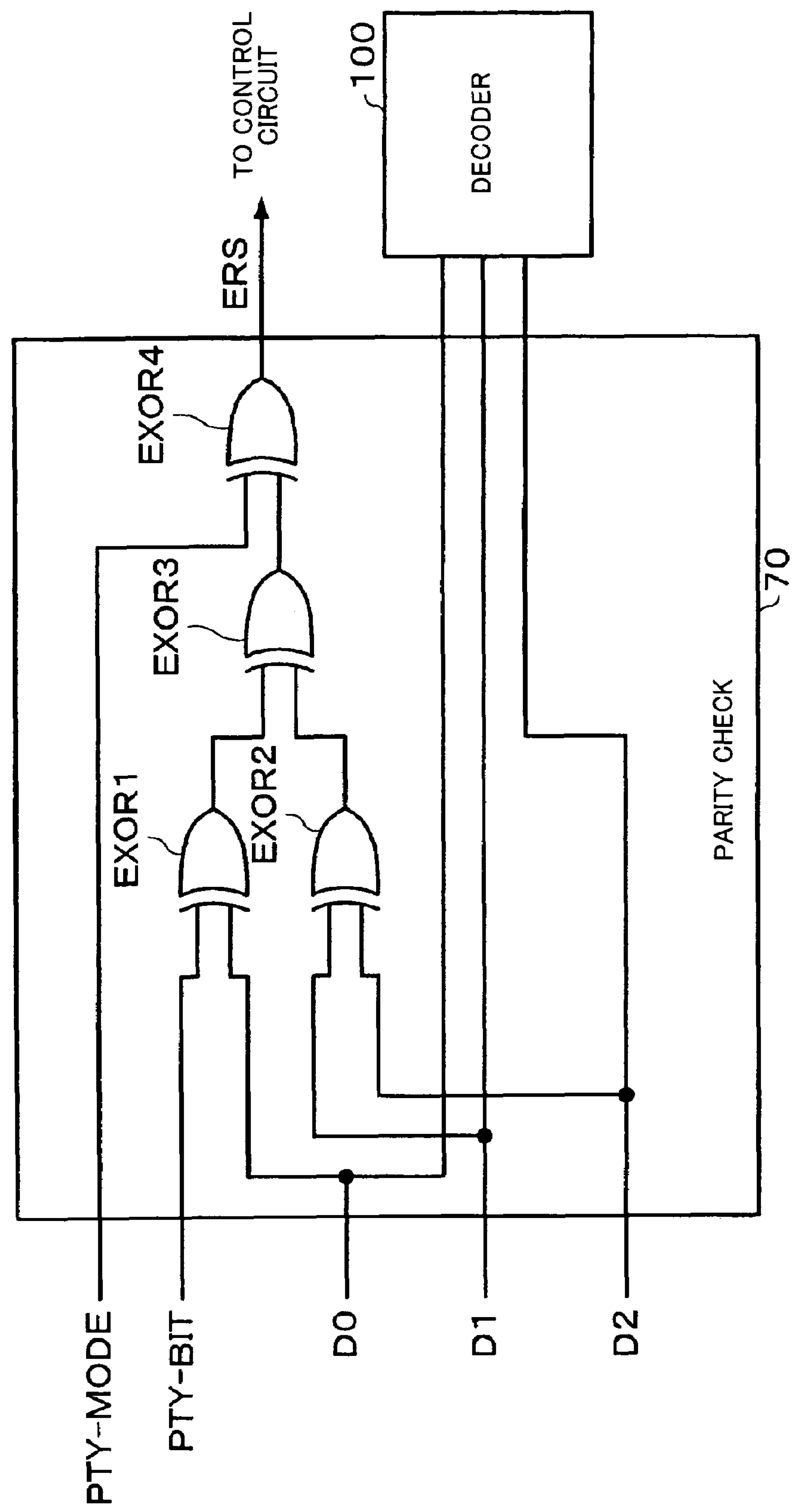
FIG. 17 is a circuit diagram showing a parity check circuit in this embodiment.

FIG. 16 is a circuit diagram showing the parity generation circuit. FIGS. 16 and 17 show 3-bit display data and 1-bit parity data for convenience of illustration.

However, the present invention is not limited thereto. The parity generation circuit 60 includes logic circuits EXOR1 to EXOR3, for example. The logic circuits EXOR1 to EXOR3 are exclusive OR circuits, for example. The parity mode PTY-MODE and the data D0 to D2 shown in FIG. 13 are input to the parity generation circuit 60. The input data D0 to D2 is directly output to the display memory 200 through the parity generation circuit 60, for example. The logical calculation result obtained by each logic circuit EXOR1 based on the parity mode PTY-MODE and the data D0 to D2 is output to the display memory 200 as the parity data PTY-BIT.

In more detail, when the parity mode is the odd parity mode and the value of the data D0 to D2 is (000), the parity mode PTY-MODE set to "1" and the data D0 to D2 set to (000) are input to the parity generation circuit 60. In this case, the logic circuit EXOR1 outputs "1" to the logic circuit EXOR3, and the logic circuit EXOR2 outputs "0" to the logic circuit EXOR3. This causes the logic circuit EXOR3 in the final stage to output "1". The output from the logic circuit EXOR1 in the final stage is input to the display memory 200 as the 1-bit parity data PTY-BIT. The same description also applies to the case where the parity mode is the even parity mode.

FIG. 17 is a circuit diagram showing the parity check circuit. The parity check circuit 70 includes logic circuits EXOR1 to EXOR4, for example. The logic circuit EXOR4 is an exclusive OR circuit, for example. The 3-bit display data and the 1-bit parity data are input to the parity check circuit 70 from the display memory 200 by the wordline control, for example. The parity mode PTY-MODE is input to the parity check circuit 70 from the control circuit 300, for example. When the 3-bit display data has been stored in the display memory 200 in the odd parity mode, the value of the parity mode PTY-MODE is "1" and the value of the parity data PTY-BIT is "1", for example. In this case, when the values of the data D0 to D2 of each bit of the 3-bit display data input to the parity check circuit 70 are (000) and the value of the parity data PTY-BIT input to the parity check circuit 70 is "1" as described above, the value output from the logic circuit EXOR3 of the parity check circuit 70 is "1" in the same manner as in the parity generation circuit 60 shown in FIG. 16. Since the value of the parity mode PTY-MODE is "1", the value output from the logic circuit EXOR4 is "0". Specifically, a data error signal ERS from the parity check circuit 70 becomes a signal indicating "0" (or signal at the low level). The output from the logic circuit EXOR4 is the data error signal ERS from the parity check circuit 70. For example, when the value of the data error signal ERS is "1" (or signal at the high level), the data error signal ERS indicates that an error has occurred in the n-bit display data.

In the above-described 3-bit display data and 1-bit parity data stored in the display memory 200 in the odd parity mode, the value of the data D0 to D2 is (000) and the value of the 1-bit parity data is "1". A case where the values of the 3-bit display data and the 1-bit parity data all become "1" due to malfunction is considered below.

In this case, since the values output from the logic circuits EXOR1 and EXOR2 are "0", the value output from the logic circuit EXOR3 is also "0". However, since the parity mode is the odd parity mode, the value of the parity mode PTY-MODE is "1". Specifically, since the output from the logic circuit EXOR4 to which "1" and "0" are input is "1", the data error signal ERS becomes a signal at the high level. This means that an error has occurred in the 3-bit display data.

5. Memory Cell

In the display memory 200 in this embodiment, the wordlines including the wordlines WL1 to WL3 are formed along the direction Y, as shown in FIG. 12. When data is not read from or written into the display memory 200, the bitlines are set at the same potential, for example. In this case, if one of the wordlines is selected due to malfunction of the display memory 200 or the like, voltage may be applied to the inverters INV1 and INV2 of the memory cell. If voltage is applied to the inverters INV1 and INV2 of the memory cell, data held in the memory cell may be rewritten. The transistors NTR1 and NTR2 which make up the memory cell are manufactured as identical transistors. However, the characteristics of the transistors such as current capability may differ to only a small extent due to element variation or the like. Specifically, even if the bitlines are set at the same potential, voltage may be applied to the inverters INV1 and INV2 due to element variation of the transistors NTR1 and NTR2. Such an element variation also exists in the remaining memory cells. It is difficult to completely eliminate variation while manufacturing the memory cells, and the yield is decreased from the viewpoint of cost.

For example, if the wordline WL1 shown in FIG. 12 is erroneously selected when data is not read from or written into the display memory 200, some memory cells connected with the wordline WL1 may be set to "0". Such a state is caused by static electricity from the outside, for example. The display panel 500 functions as an antenna, whereby the display memory 200 is affected by external static electricity. The interconnect density of the display panel is increased as the resolution of the display panel is increased, whereby the above-mentioned effect occurs to a considerable extent.

In the case where the memory cell is rewritten as "0" rather than "1" when malfunction of the transistors NTR1 and NTR2 of the memory cell of the display memory 200 connected with the wordline has occurred, the s-bit parity data may be set so that the sum of a value of each bit of the n-bit display data and the s-bit parity data is an odd number. In the case where the memory cell is rewritten as "1" rather than "0" when malfunction of the transistors NTR1 and NTR2 of the memory cell of the display memory 200 connected with the wordline has occurred, the s-bit parity data may be set so that the sum of a value of each bit of the n-bit display data and the s-bit parity data is an even number.

The memory cells connected with the wordline selected when the bitlines are set at the same potential are divided into memory cells rewritten as "1" and memory cells rewritten as "0" due to variation of the transistors PTR1 and PTR2 of each memory cell connected with the wordline. When manufacturing the display memory 200, the display memory 200 in which the number of memory cells rewritten as "1" is greater and the display memory 200 in which the number of memory cells rewritten as "0" is greater are obtained.

Therefore, the s-bit parity data is written in the odd parity mode into the display memory 200 in which the number of memory cells rewritten as "0" is greater, for example. This enables occurrence of a data error to be detected in the odd parity mode even if each bit of the n-bit display data and the s-bit parity data is all rewritten as "0", for example. The s-bit parity data is written in the even parity mode into the display memory 200 in which the number of memory cells rewritten as "1" is greater, for example. This enables occurrence of a data error to be detected in the even parity mode if the value of (s+n) is an odd number even if each bit of the n-bit display data and the s-bit parity data is all rewritten as "1", for example.

Figure 18:
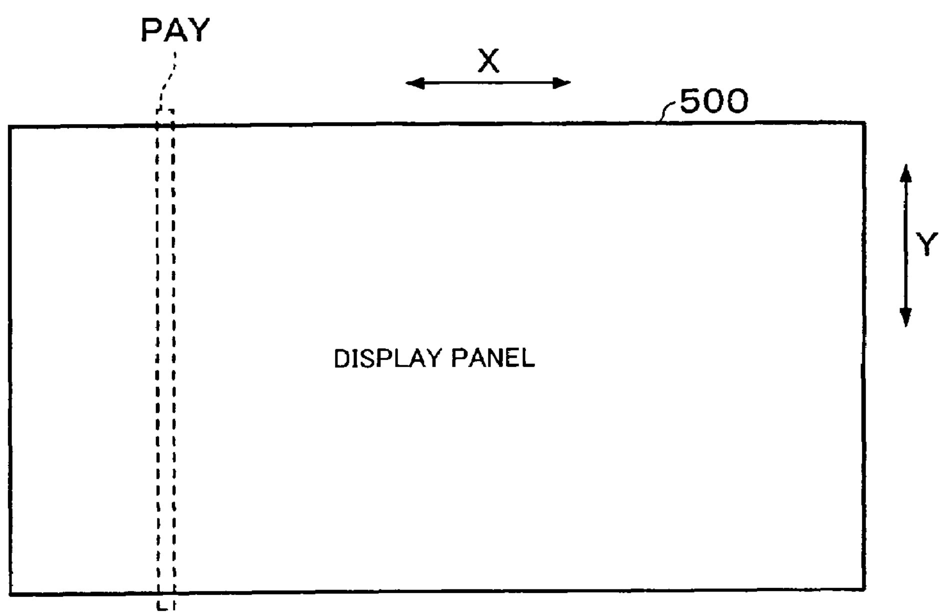
FIG. 18 shows an effect on a display panel when a data error has occurred in display data.

FIG. 18 shows the effect on the display panel when a data error has occurred in the display data. A section indicated by a symbol PAY is a section in which the display pixels of the display panel 500 are displayed in white due to occurrence of a data error, for example. Specifically, when a data error has occurred in the memory cells connected with the wordline WL1, an image is displayed so that one vertical line occurs in the section of the display panel 500 as indicated by the symbol PAY, for example.

In this embodiment, the data error signal ERS shown in FIG. 17 is output to the processor interface 50 or the control circuit 300, for example. Specifically, since occurrence of a data error can be detected, the data can be immediately rewritten. For example, when the data error signal ERS received by the control circuit 300 is a signal at the high level, the display data may be rewritten into the memory cells of the display memory 200 in which the erroneous display data is stored. This enables occurrence of a data error to be detected even if a data error has occurred in the display data due to malfunction of the display memory 200 or the like, whereby the effect which appears on the display panel 500 as that shown in FIG. 18 can be prevented.

The memory cell may be rewritten as "0" when the wordline is erroneously selected due to malfunction or the like by providing an offset in advance to the current capability of the transistors NTR1 and NTR2 of each memory cell shown in FIG. 12.

This causes all the memory cells connected with the selected wordline to be set to "0", whereby erroneous selection of the wordline can be reliably detected. In more detail, the current capability of the transistor NTR1 is designed to differ from the current ability of the transistor NTR2 by setting the channel width and the gate length of the transistor NTR1 to values differing from the channel width and the gate length of the transistor NTR2. Therefore, when the wordline is erroneously selected in a state in which the bitlines are set at the same potential, "0" or "1" is written into all the memory cells connected with the selected wordline.

6. Comparison With Comparative Example

Figure 19:
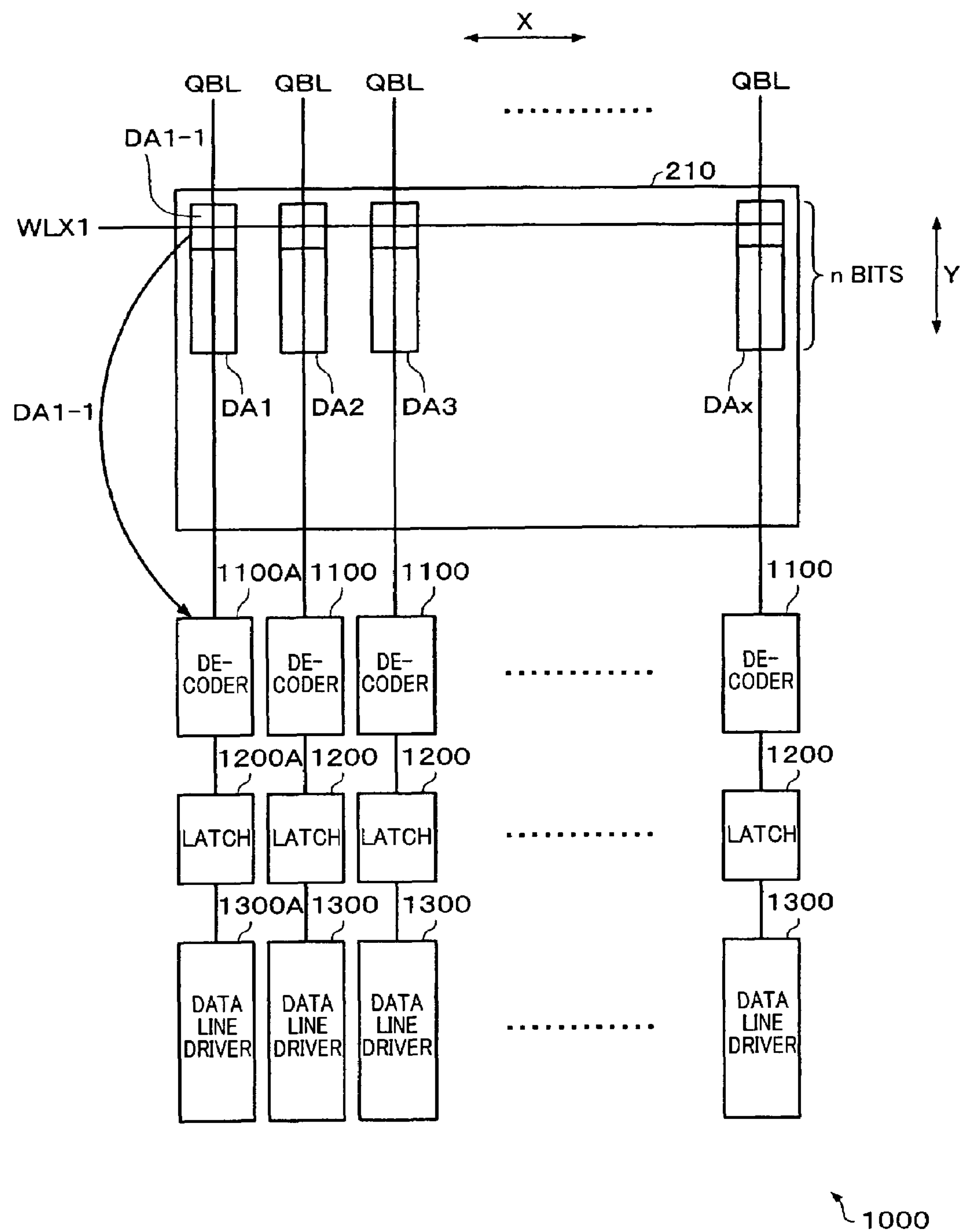
FIG. 19 shows a display driver in a comparative example.

FIG. 19 shows a display driver 1000 in a comparative example. The display driver 1000 includes a display memory 210, a plurality of decoders 1100, a plurality of latch circuits 1200, and a plurality of data line driver sections 1300, for example. The decoder 1100 includes a grayscale decoder which decodes grayscale data, and a multi-line select drive decoder which generates data which selects a drive voltage of the data line driver section 1300, for example.

A wordline is formed in the display memory 210 along the direction X. A plurality of bitlines QBL are formed in the display memory 210 along the direction Y, and are arranged along the direction X. A plurality of wordlines WLX are arranged in the display memory 210 along the direction Y. However, FIG. 19 shows one wordline WLX1 for convenience of description.

When the wordline WLX1 is selected, 1-bit data DA1-1 stored in a memory cell connected with the wordline WLX1 is output to a decoder 1100A from the n-bit display data DA1 stored in the display memory 210. 1-bit data stored in each memory cell connected with the wordline WLX1 is output from n-bit display data DA2 to DAx (x is an integer greater than one) to the corresponding decoder 1100 through the bitline QBL.

Specifically, 1-bit display data is output to each decoder 1100 by one wordline selection. In the case where the amount of information necessary for the decoder 1100 to decode the display data is n bits, a latch circuit or the like may be provided to each decoder 1100, and n-bit data may be stored in the decoder 1100 by selecting the wordlines n times.

However, as the resolution of the display panel is increased, the number of decoders 1100 is increased accompanying an increase in the number of data lines. An increase in the number of decoders 1100 increases the chip area, whereby manufacturing cost is increased. In the display driver 10 in this embodiment, since one decoder 100 outputs the drive voltage select data to the latch circuits LA1 to LAx, the chip area can be significantly reduced. A reduction in the chip area reduces manufacturing cost and increases the degrees of freedom of the layout.

Figure 20:
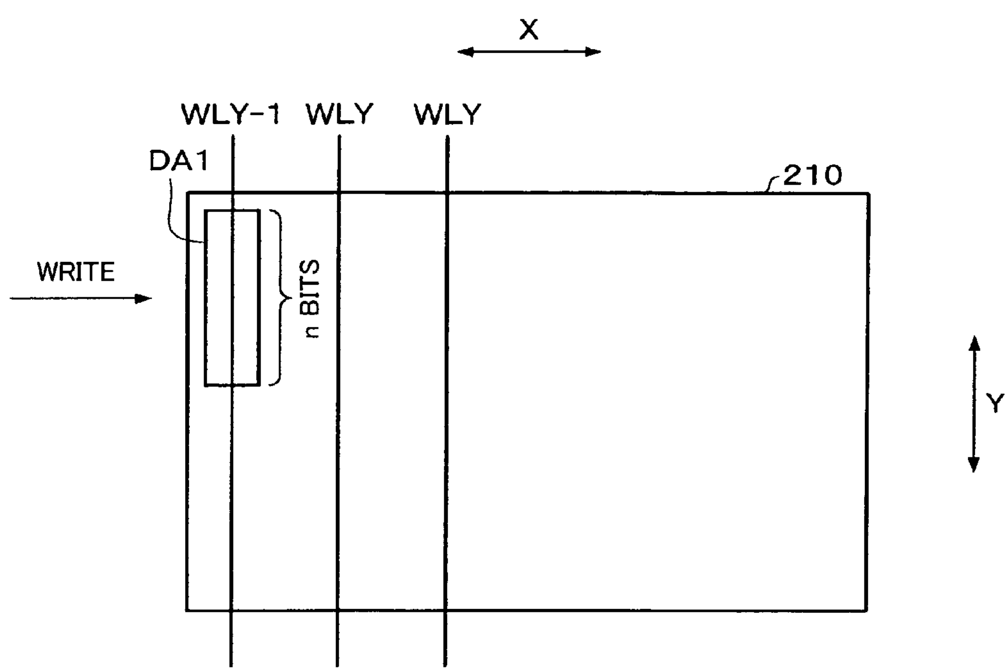
FIG. 20 shows a display memory in the comparative example.

The operation of writing display data into the display memory 210 of the display driver 1000 in the comparative example is described below. FIG. 20 shows the display memory 210 in the comparative example. The display memory 210 includes a plurality of wordlines WLY in addition to the bitlines QBL. The wordline WLY is formed in the display memory 210 along the direction Y. In the case of writing the n-bit display data DA1 into the display memory 210, the wordline WLY-1 is selected, whereby the display data DA1 is written into the memory cells connected with the wordline WLY-1. Specifically, data of each bit of the n-bit display data DA1 is stored in the memory cells arranged along the direction Y The arrangement of the memory cells in which the data of each bit of the display data DA1 is stored is the same as that for the n-bit display data DA1 stored in the display memory 200 in this embodiment.

Specifically, the display data DA1 can be written into the display memory 200 in the same manner as in the case of using the display driver 1000 in the comparative example. For example, a memory control program created for using the display driver 1000 in the comparative example may be easily applied to the display driver 10 in this embodiment. The design period can be reduced by providing compatibility with the display driver 1000 in the comparative example as to the writing method of the display data into the display memory.

In the display memory 200 in this embodiment, the amount of data which can be stored in unit area of the display memory is greater than that of the display memory 210 in the comparative example. Specifically, the layout size per bit of the memory cell is reduced, and the number of interconnects provided in the display memory is also reduced. Therefore, the display driver 10 including the display memory 200 enables the chip area to be significantly reduced in comparison with the display driver 1000 in the comparative example, whereby manufacturing cost is reduced.

Figure 21:
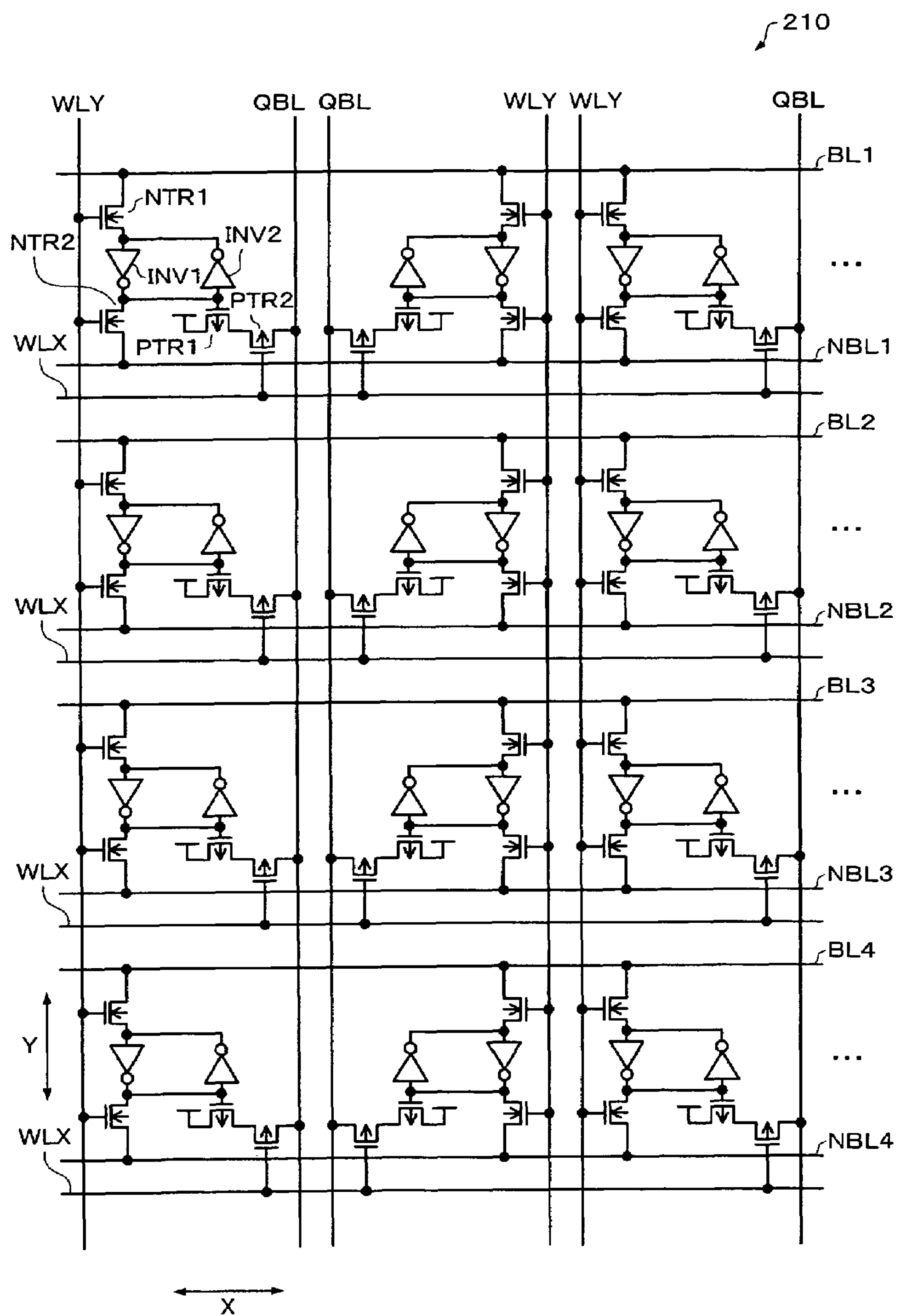
FIG. 21 shows a part of the display memory in the comparative example.

In order to describe the above-described effect, FIG. 21 provides a circuit diagram showing a part of the display memory 210 in the comparative example. The wordlines WLY, the bitlines QBL, and the wordlines WLX are provided in the display memory 210. The bitlines BL and NBL are formed in the display memory 210 along the direction X. FIG. 21 shows only the bitlines BL1 to BL4 and NBL1 to NBL4. In the display memory 210, a memory cell which can store 1-bit data includes N-type transistors NTR1 and NTR2 and P-type transistors PTR3 and PTR4. The memory cell of the display memory 210 includes inverters INV1 and INV2.

When writing the display data into the display memory 210, the wordline WLY formed along the direction Y is selected, and the data is written into the memory cell through the bitlines BL and NBL formed along the direction X. When reading the display data from the display memory 210, the wordline WLX formed along the direction X is selected, and the data stored in the memory cell is output through the bitline QBL formed along the direction Y In the case where the data is input to one memory cell through two systems consisting of the bitlines BL1 and NBL1, and the data stored in the memory cell is output through one system consisting of the bitline QBL which is another system of the bitlines BL1 and NBL1, such a memory cell is called a 1.5-port memory cell.

The P-type transistors PTR3 and PTR4 provided in the 1.5-port memory cell in the comparative example are not provided in the one-port memory cell shown in FIG. 12. The wordlines WLX and the bitlines QBL provided in the display memory 210 in the comparative example are not provided in the display memory 200 in this embodiment. Specifically, in the case where the display memory 200 and the display memory 210 can store the same amount of data, the display memory 200 in this embodiment enables the chip size to be significantly reduced in comparison with the display memory 210 in the comparative example.

7. Modification

Figure 22:
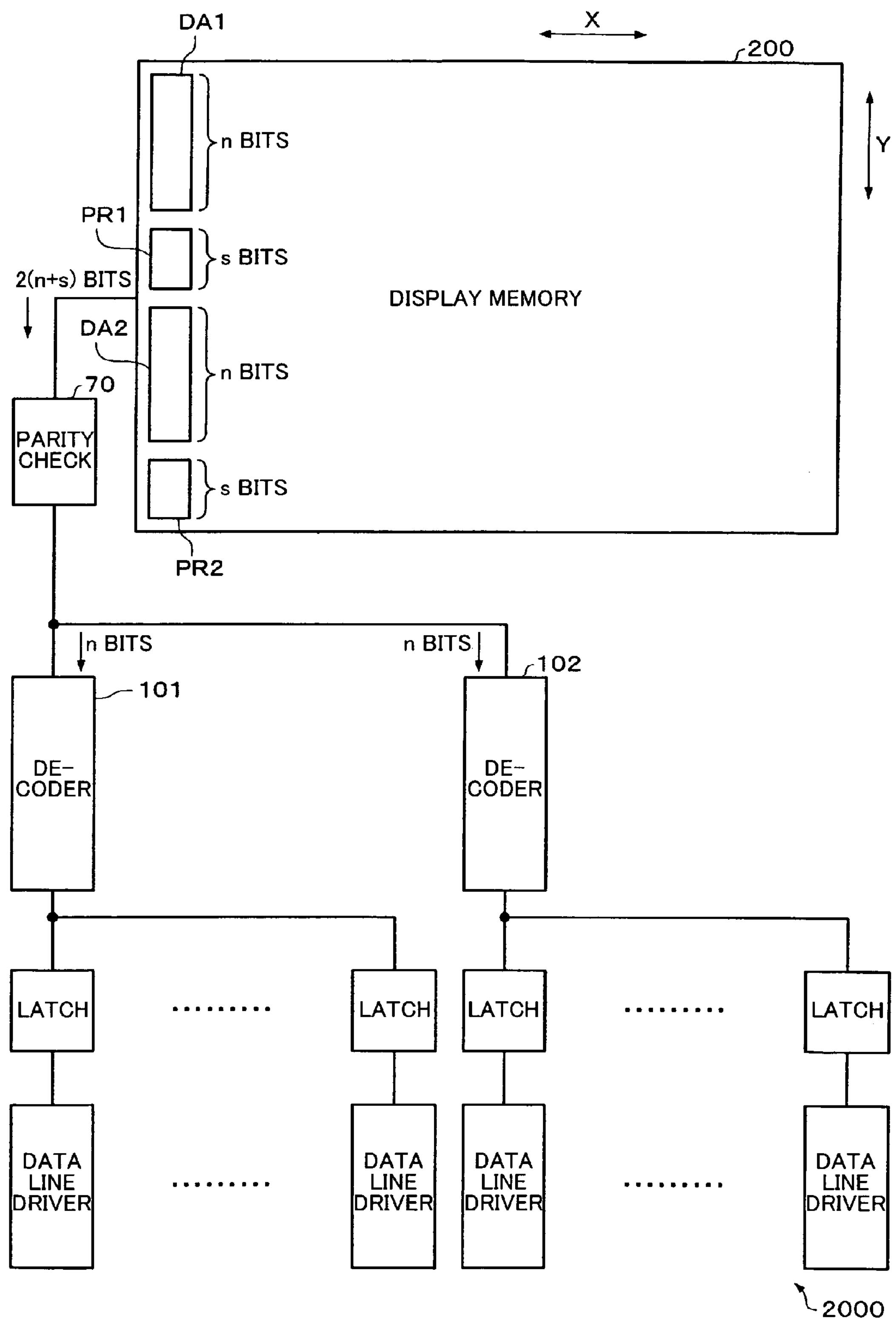
FIG. 22 shows a display driver according to a modification of this embodiment.

FIG. 22 shows a modification of the display driver 10 in this embodiment. A display driver 2000 which is a modification of this embodiment includes the parity check circuit 70, the display memory 200, decoders 101 and 102, a plurality of latch circuits, and a plurality of data line driver sections. However, the present invention is not limited thereto. For example, the display driver 2000 may have a configuration in which the display memory 200 is omitted. 2(n+s)-bit data consisting of the n-bit display data DA1 and DA2 and the s-bit parity data PR1 and PR2 is read from the display memory 200. The parity check circuit 70 outputs the n-bit display data DA1 of the 2(n+s)-bit data to the decoder 101, and outputs the n-bit display data DA2 to the decoder 102, for example. The decode processing of the display data cannot be completed within one display period as the resolution of the display panel is increased, whereby the display state of the display panel may be affected. However, since the decode processing of the display data can be distributed over the decoders 101 and 102 by using the display driver 2000, the display data can be displayed on the display panel at a high image quality even if the display panel has a higher resolution.

8. Electronic Instrument

Figure 23:
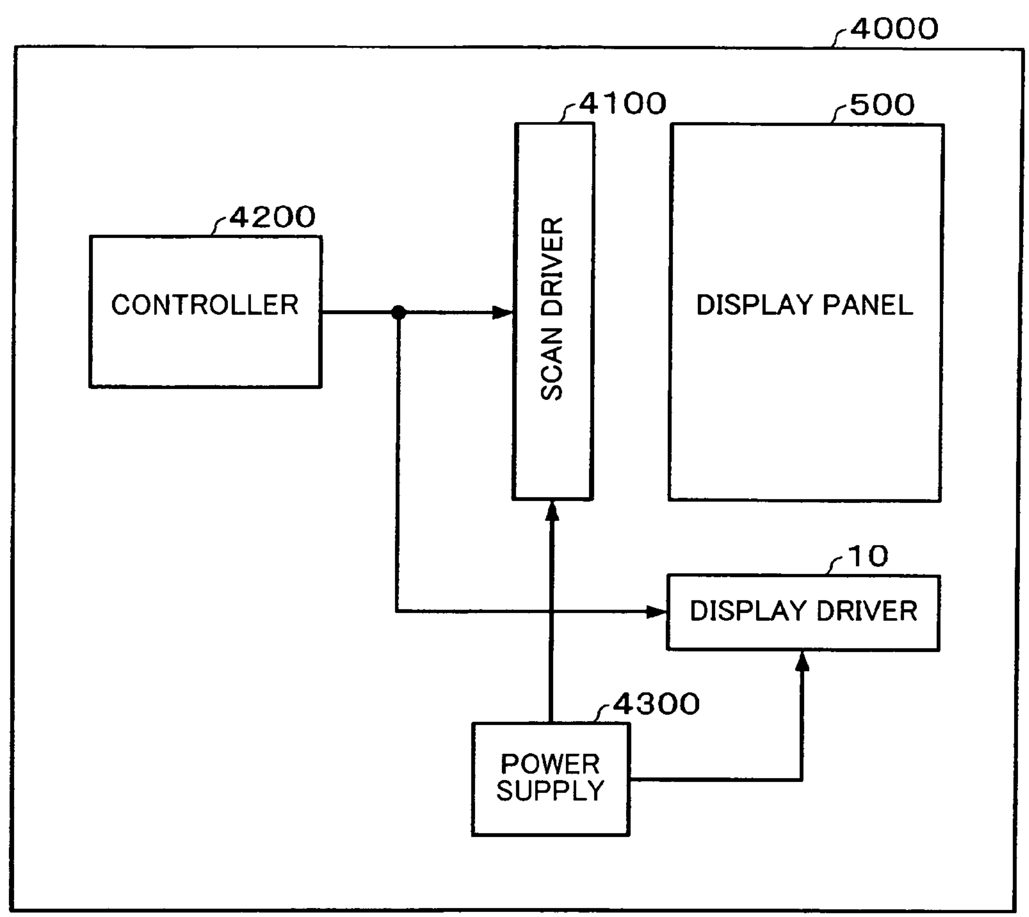
FIG. 23 shows an electronic instrument according to this embodiment.

FIG. 23 is a block diagram showing a configuration of an electronic instrument including the display driver 10 according to this embodiment. An electronic instrument 4000 shown in FIG. 23 includes the display driver 10, the display panel 500, a scan driver 4100 which drives the scan lines of the display panel 500, a controller 4200 which supplies a control signal or the like to the display driver 10 and the scan driver 4100, and a power supply 4300. However, the present invention is not limited thereto. For example, the controller 4200 or the power supply may be omitted, or another device may be additionally provided.

Since the display driver 10 is provided in the electronic instrument 4000, manufacturing cost of the electronic instrument 4000 can be reduced. Moreover, since occurrence of a data error of the display memory caused by external static electricity or the like can be detected, an electronic instrument including a high-quality display panel can be provided.

The s-bit parity data generated by the parity generation circuit 60 is stored in the display memory 200 in this embodiment. However, the present invention is not limited thereto. For example, the processor may generate the s-bit parity data and store the s-bit parity data in the display memory 200.

The present invention is not limited to the above-described embodiments, and various modifications can be made within the scope of the invention. For example, any term (such as FRC decoder, FRCROM, MLS decoder, select signal which selects the wordline, or flip flop) cited with a different term having broader or the same meaning (such as grayscale decoder, grayscale ROM, multi-line select drive decoder, address information on the display memory, or latch circuit) at least once in this specification and drawings can be replaced by the different term in any place in this specification and drawings.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A display driver, comprising:

a parity generation circuit that generates s-bit (s is an integer of one or more) parity data for n-bit (n is an integer greater than one) display data input through a processor interface, combines the n-bit display data and the s-bit parity data, and outputs the combined n-bit display data and s-bit parity data to a display memory as (n+s)-bit display data;

a parity check circuit that performs data error detection for the (n+s)-bit display data sequentially input from the display memory in units of (n+s) bits, and outputs the n-bit display data;

at least one decoder that decodes the n-bit display data output from the parity check circuit;

a plurality of latch circuits that latch the data decoded by the decoder; and a plurality of data line driver sections that drive data lines of a display panel based on the data latched by the latch circuits, the parity generation circuit generating the s-bit parity data based on a sum of a value of each bit of the n-bit display data so that a sum of a value of each bit of the (n+s)-bit display data becomes an even number or an odd number, and outputs the (n+s)-bit display data to the display memory, when a value held in a memory cell is more frequently rewritten as “0” than “1” upon occurrence of a malfunction of a transistor connected with a wordline of the memory cell of the display memory, the s-bit parity data being set so that the sum of a value of each bit of the (n+s)-bit display data output from the parity generation circuit is an odd number, and when the held value is more frequently rewritten as “1” than “0” upon occurrence of a malfunction of the transistor connected with the wordline of the memory cell of the display memory, the s-bit parity data being set so that the sum of a value of each bit of the (n+s)-bit display data output from the parity generation circuit is an even number.

2. The display driver as defined in claim 1, the (n+s)-bit display data being read from the display memory and output to the parity check circuit by performing a wordline control for the display memory once, the decoder decoding the n-bit display data sequentially output from the parity check circuit in units of n bits, and sequentially outputting the decoded data to the latch circuits, and each of the data line driver sections driving a corresponding one of the data lines after the decoded data has been stored in the latch circuits.

3. The display driver as defined in claim 1, when the sum of a value of each bit of the (n+s)-bit display data output from the parity generation circuit is an even number, the parity check circuit outputting a data error signal to the processor interface when the sum of a value of each bit of the (n+s)-bit display data output from the display memory is an odd number, and when the sum of a value of each bit of the (n+s)-bit display data output from the parity generation circuit is an odd number, the parity check circuit outputting the data error signal to the processor interface when the sum of a value of each bit of the (n+s)-bit display data output from the display memory is an even number.

4. The display driver as defined in claim 1, the parity check circuit outputting the n-bit display data to the decoder irrespective of whether or not a data error has been detected during the data error detection for the (n+s)-bit display data.

5. The display driver as defined in claim 1, further comprising:

an address decoder that generates a latch pulse for the latch circuits to latch output from the decoder, the address decoder selecting one of the latch circuits based on address information on the display memory when the n-bit display data is read, and outputs the latch pulse to the selected latch circuit.

6. The display driver as defined in claim 5, the n-bit display data being read from the display memory in synchronization with one of a rising edge and a falling edge of a clock signal from a control circuit, and the address decoder outputting the latch pulse in synchronization with the other of the rising edge and the falling edge of the clock signal.

7. The display driver as defined in claim 1, a shift register being formed by the latch circuits by connecting the latch circuits in series and connecting an output terminal of one of the latch circuits with an input terminal of one of the latch circuits in a subsequent stage, and the shift register shifting data sequentially input from the decoder to one of the latch circuits in a first stage and stores the shifted data.

8. The display driver as defined in claim 1, the decoder including a multi-line select drive decoder, and the multi-line select drive decoder generating drive voltage select data for selecting a drive voltage from among a plurality of drive voltages for a multi-line select drive of scan lines based on display data for m (m is an integer greater than one) pixels extracted from the n-bit display data, and outputting the drive voltage select data to the latch circuits.

9. The display driver as defined in claim 8, each of the data line driver sections selecting a data line drive voltage from among the drive voltages based on the drive voltage select data stored in one of the latch circuits, and the data line driver sections driving the data lines by using the data line drive voltage.

10. The display driver as defined in claim 1, the decoder including a grayscale decoder, and the grayscale decoder determining a display pattern of a pixel indicated by the n-bit display data based on the n-bit display data and frame information.

11. The display driver as defined in claim 10, the grayscale decoder outputting data “0” or “1” to at least one of the latch circuits based on the display pattern.

12. The display driver as defined in claim 10, the decoder further including a multi-line select drive decoder for a multi-line select drive method that simultaneously selects and drives m (m is an integer greater than one) scan lines, and the multi-line select drive decoder outputting drive voltage select data for selecting a data line drive voltage for driving the data line to the latch circuits based on the display pattern determined by the grayscale decoder.

13. The display driver as defined in claim 12, each of the data line driver sections selecting the data line drive voltage from among a plurality of types of drive voltages for a multi-line select drive of scan lines based on the drive voltage select data stored in one of the latch circuits, and each of the data line driver sections driving the data line using the data line drive voltage.

14. The display driver as defined in claim 13, a grayscale of each pixel in display data for m pixels extracted from the n-bit display data being indicated by k-bit (k is an integer greater than one) grayscale data, the grayscale decoder including a grayscale ROM for determining a grayscale pattern that indicates two types of display states based on the k-bit grayscale data and the frame information, the grayscale decoder determining the grayscale pattern for each of the m pixels based on the grayscale ROM, and outputting m-bit display data that indicates the display state of each of the m pixels by “0” or “1” based on the determined grayscale pattern to the multi-line select drive decoder, and the multi-line select drive decoder generating the drive voltage select data based on the m-bit display data, and outputting the drive voltage select data to the latch circuits.

15. An electronic instrument, comprising:

the display driver as defined in claim 1;

a display panel;

a scan driver that drives scan lines of the display panel;

a controller that controls the display driver and the scan driver; and a power supply circuit.

* * * * *